(12) United States Patent
Bever et al.

(10) Patent No.: US 8,306,356 B1
(45) Date of Patent: Nov. 6, 2012

(54) SYSTEM, PLUG-IN, AND METHOD FOR IMPROVING TEXT COMPOSITION BY MODIFYING CHARACTER PROMINENCE ACCORDING TO ASSIGNED CHARACTER INFORMATION MEASURES

(75) Inventors: Thomas G Bever, Tucson, AZ (US); Christopher D Nicholas, Tucson, AZ (US); Roeland Hancock, Tucson, AZ (US); Keith W Alcock, Tucson, AZ (US); Steven M Jandreau, Tucson, AZ (US)

(73) Assignee: Language Technologies, Inc., Tucson, AZ (US)

( * ) Notice: Subject to any disclaimer, the term of this patent is extended or adjusted under 35 U.S.C. 154(b) by 1049 days.

(21) Appl. No.: 12/235,657

(22) Filed: Sep. 23, 2008

Related U.S. Application Data

(60) Provisional application No. 60/995,771, filed on Sep. 28, 2007.

(51) Int. Cl.
*G06K 9/00* (2006.01)
(52) U.S. Cl. .......................... 382/275; 382/292; 382/301
(58) Field of Classification Search .................. None
See application file for complete search history.

(56) References Cited

U.S. PATENT DOCUMENTS

| | | | |
|---|---|---|---|
| 4,225,249 A | | 9/1980 | Kettler |
| 4,783,760 A | | 11/1988 | Carosso |
| 4,933,866 A | * | 6/1990 | Markoff et al. ............... 345/471 |
| 5,122,953 A | * | 6/1992 | Uekusa et al. ................ 715/210 |
| 5,164,899 A | | 11/1992 | Sobotka |
| 5,185,818 A | * | 2/1993 | Warnock ....................... 382/112 |
| 5,398,306 A | * | 3/1995 | Karow .......................... 358/1.11 |
| 5,399,029 A | | 3/1995 | Muraoka |
| 5,579,416 A | * | 11/1996 | Shibuya et al. ............... 382/293 |
| 5,724,498 A | * | 3/1998 | Nussbaum .................... 345/471 |
| 5,745,097 A | | 4/1998 | Cappels |
| 5,768,490 A | | 6/1998 | Hersch |
| 5,778,403 A | | 7/1998 | Bangs |

(Continued)

OTHER PUBLICATIONS

Steven Jandreau et al "Improving the readability of text with automatic phrase-sensitive formating", British Journal of Educational Technology No. 2 vol. May 17, 1986, pp. 128-133.

(Continued)

*Primary Examiner* — Brian P Werner
(74) *Attorney, Agent, or Firm* — Eric A. Gifford

(57) ABSTRACT

A computer implemented system, plug-in application and method for composing a formatted text input to improve legibility, readability and/or print economy while preserving the format of the text input and satisfying any user selected aesthetic constraints. This is accomplished by reading in blocks of text input having defined characters including letters and punctuation in a given input format. A language unit such as a lexical or sub-lexical unit, a subset of punctuation or another defined unit for a particular language is examined and an information measure (IM) is assigned to each character in the language unit indicating the predictability of that character to differentiate the language unit from other language units. Typically, multiple different IMs are assigned to each character and combined to form a combined IM (CIM). The process is repeated for at least a plurality of language units and typically until all the text input in the block has been analyzed and information measures assigned to all of the characters. An adjustment to a physical feature is determined for each character in the plurality of units to modify the visual prominence of that character according to the values of the assigned information measures and a permitted range of physical variation for the block. The adjustments are applied to each character to compose the text input consistent with the input format.

34 Claims, 24 Drawing Sheets

U.S. PATENT DOCUMENTS

| | | | |
|---|---|---|---|
| 5,802,532 | A | 9/1998 | Nakayama |
| 5,802,533 | A | 9/1998 | Walker |
| 5,803,629 | A | 9/1998 | Neville |
| 5,876,132 | A | 3/1999 | Zable |
| 5,883,637 | A | 3/1999 | Nakayama |
| 5,937,420 | A | 8/1999 | Karow |
| 5,978,819 | A | 11/1999 | Berstis |
| 5,995,086 | A * | 11/1999 | Dowling et al. ............... 345/467 |
| 6,056,551 | A | 5/2000 | Marasco |
| 6,223,191 | B1 | 4/2001 | Truelson |
| 6,279,017 | B1 | 8/2001 | Walker |
| 6,279,018 | B1 | 8/2001 | Kudrolli |
| 6,292,176 | B1 | 9/2001 | Reber |
| 6,321,243 | B1 | 11/2001 | Ballard |
| 6,441,824 | B2 | 8/2002 | Hertzfeld |
| 6,510,441 | B1 | 1/2003 | Kenninga |
| 6,535,819 | B1 | 3/2003 | Clark |
| 6,768,497 | B2 * | 7/2004 | Baar et al. ..................... 345/661 |
| 8,001,465 | B2 * | 8/2011 | Kudrolli et al. ............... 715/243 |
| 2008/0082913 | A1 * | 4/2008 | Lloyd ........................... 715/246 |
| 2009/0193334 | A1 * | 7/2009 | Assadollahi .................. 715/261 |

OTHER PUBLICATIONS

Thomas G Bever et al "Spacing printed text to isolate major phrases improves readability" Department of Psychology, Meliora Hall, University of Rochester, Rochester, NY 14627, pp. 74-87, Visible Language, 25:1 1990.

Steven Jandreau and Thomas Bever "Phrase-spaced formats improve comprehension in average readers" Journal of Applied Psychology 1992, vol. 77, No. 2, 143-146.

* cited by examiner

| | | the | big | elephant | was | breaking | the | small | window | in | the | garden |
|---|---|---|---|---|---|---|---|---|---|---|---|---|
| a. Frequency of word (w) | | 3,360,769 | 29,827 | 300 | 391,867 | 2,887 | 3,360,769 | 21,467 | 3,161 | 1,184,703 | 3,360,769 | 2,518 |
| b. $\frac{1}{\log_2 w}$ | 414 → | 0.0461 | 0.0673 | 0.1215 | 0.0538 | 0.0870 | 0.0461 | 0.0695 | 0.0860 | 0.0496 | 0.0461 | 0.0885 |
| c. $w^{-2/3}$ | 414 → | 0.0067 | 0.0322 | 0.1404 | 0.0137 | 0.702 | 0.0067 | 0.0360 | 0.0681 | 0.0095 | 0.0067 | 0.0735 |

Unmodified — The big elephant was breaking the small window in the garden.

415 → Lexical prominence modified as in b — The big elephant was breaking the small window in the garden.

415 → Lexical prominence modified as in c — The big elephant was breaking the small window in the garden.

416 → Lexical prominence modified as in c — The big elephant was breaking the small window in the garden.

FIG. 7A

| | | el | elephante | gigante | rompía | la | ventana | chica | en | el | jardín |
|---|---|---|---|---|---|---|---|---|---|---|---|
| a. Frequency of word (w) | | 3,360,769 | 29,827 | 300 | 391,867 | 2,887 | 3,360,769 | 21,467 | 3,161 | 1,184,703 | 3,360,769 |
| b. $\frac{1}{\log_2 w}$ | 414 → | 0.0461 | 0.0673 | 0.1215 | 0.0538 | 0.0870 | 0.0461 | 0.0695 | 0.0860 | 0.0496 | 0.0461 |
| c. $w^{-2/3}$ | 414 → | 0.0067 | 0.0322 | 0.1404 | 0.0137 | 0.702 | 0.0067 | 0.0360 | 0.0681 | 0.0095 | 0.0067 |

Unmodified — El elefante gigante rompía la ventana chica en el jardín.

415 → Lexical prominence modified as in b — El elefante gigante rompía la ventana chica en el jardín.

415 → Lexical prominence modified as in c — El elefante gigante rompía la ventana chica en el jardín.

FIG. 7B

Target 'head' (frequency of 402)
a. Competitor and competitor frequency by character position

|     | h     | e    | a    | d    |
| --- | ----- | ---- | ---- | ---- |
|     | bead  | heed | heal |      |
|     | dead  |      | held | heap |
|     | lead  |      | herd | hear |
|     | mead  |      |      | heat |
|     | read  |      |      |      |
|     | 8     |      | 3    | 8    |
|     | 114   |      | 1    | 10   |
|     | 58    |      | 10   | 1    |
|     | 3     |      |      | 55   |
|     | 284   |      |      |      |

| | | h | e | a | d |
|---|---|---|---|---|---|
| 421 → | b. Number of competitors by position ($n$) | 5 | 0 | 3 | 4 |
| 422 → | c. $1 - (1/n)$ | 0.80 | 1.00 | 0.66 | 0.75 |
| | d. relative frequency, $1 - \dfrac{f_{target}}{f_{target} + \Sigma f_{competitors}}$ | 0.54 | 0.00 | 0.03 | 0.16 |
| 423 → | e. information entropy, $\sum_{i=1}^{n} p(x_i) \log_2 p(x_i)^{-1}$ | 0.75 | 0.00 | 0.15 | 0.39 |
| 424 → | f. relative information entropy, $\dfrac{\sum_{i=1}^{n} p(x_i) \log_2 p(x_i)^{-1}}{\log_2 26}$ | 0.16 | 0.00 | 0.03 | 0.08 |

| | e | l | e | p | h | a | n | t |
|---|---|---|---|---|---|---|---|---|
| | 0.9728 | 0.9697 | 0.9650 | 1.000 | 0.9674 | 0.8600 | 0.8844 | 0.8930 | g. minimum edit distance

Unmodified: head

Character prominence modified as in f: head

Unmodified: elephant

Character prominence modified as in g: elephant

FIG. 7C

| | the | big | elephant | was | breaking | the | small | window | in | the | garden |
|---|---|---|---|---|---|---|---|---|---|---|---|
| a. frequency of puctuation after word (w) | 5,013 | 3,861 | 115 | 5,199 | 91 | 5013 | 3522 | 940 | 13,210 | 5,013 | 885 |
| b. frequency of spaces after w | 3,355,756 | 25,966 | 185 | 386,668 | 2,796 | 3,355,756 | 17,945 | 2,221 | 1,171,493 | 3,365,756 | 1,633 |
| c. frequency of puctuation before w | 293,794 | 976 | 9 | 27,595 | 821 | 293,794 | 654 | 60 | 62,044 | 293,794 | 70 |
| d. frequency of spaces before w | 3,066,975 | 28,851 | 291 | 364,272 | 2066 | 3,066,975 | 20,813 | 3101 | 1,122,659 | 3,066,975 | 2,448 |
| e. $\frac{\text{frequency of puctuation after } w}{\text{frequency of spaces after } w}$ | 0.0015 | 0.1487 | 0.6216 | 0.0134 | 0.0325 | 0.0015 | 0.1963 | 0.4232 | 0.0113 | 0.0015 | |
| f. $\frac{\text{frequency of puctuation before } w+1}{\text{frequency of spaces before } w+1}$ | 0.0338 | 0.0309 | 0.0758 | 0.3974 | 0.0958 | 0.0314 | 0.0193 | 0.0553 | 0.0958 | 0.0286 | |
| g. $e + f$ | 0.0353 | 0.1796 | 0.06974 | 0.4108 | 0.1283 | 0.0329 | 0.2156 | 0.4785 | 0.1071 | 0.0301 | |
| h. $e \times f$ | 0.0001 | 0.0046 | 0.0471 | 0.0053 | 0.0031 | 0.0000 | 0.0038 | 0.0234 | 0.0011 | 0.0000 | |
| i. $\frac{\text{frequency of puctuation after } w}{\text{frequency of puctuation before \& after } w}$ | 0.0168 | 0.7982 | 0.9274 | 0.1585 | 0.0998 | 0.0998 | 0.0168 | 0.8434 | 0.1755 | 0.0168 | |
| j. $\frac{\text{frequency of puctuation before } w+1}{\text{frequency of puctuation before and after } w+1}$ | 0.2018 | 0.0726 | 0.8415 | 0.9002 | 0.9832 | 0.1566 | 0.0600 | 0.8245 | 0.9832 | 0.0733 | |
| k. $i + j$ | 0.2186 | 0.8708 | 1.7689 | 1.0588 | 1.0830 | 0.1734 | 0.9034 | 1.7645 | 1.1588 | 0.0901 | |
| l. $i \times j$ | 0.0034 | 0.0579 | 0.7804 | 0.1427 | 0.0981 | 0.0026 | 0.0506 | 0.7750 | 0.1726 | 0.0012 | |

Unmodified   The big elephant was breaking the small window in the garden.

Space prominence modified as in $h \times 10$   The big elephant was breaking the small window in the garden.

Space prominence modified as in $l$   The big elephant was breaking the small window in the garden.

FIG. 7D

| 1002→ | el | gran | elefante | rompía | la | pequeña | ventana | en | el | jardín |
|---|---|---|---|---|---|---|---|---|---|---|
| a. frequency of puctuation after word (w) | 251 | 102 | 65 | 155 | 229 | 2411 | 296 | 632 | 251 | 1,324 |
| b. frequency of spaces after w | 2,137,091 | 12,183 | 176 | 566 | 2,766,931 | 7,256 | 769 | 2,084,034 | 2,137,091 | 5110 |
| c. frequency of puctuation before w | 231,867 | 3,413 | 26 | 455 | 168,266 | 87 | 7 | 208,055 | 231,867 | 484 |
| d. frequency of spaces before w | 1,905,475 | 8872 | 215 | 266 | 2,598,894 | 9580 | 1058 | 1,876,611 | 1,905,475 | 5500 |
| e. frequency of puctuation after w / frequency of spaces after w | 0.0001 | 0.0084 | 0.3693 | 0.2739 | 0.0001 | 0.3323 | 0.3849 | 0.0003 | 0.0001 | |
| f. frequency of puctuation before w + 1 / frequency of spaces before w + 1 | 0.3847 | 0.1209 | 1.7105 | 0.0647 | 0.0091 | 0.0066 | 0.1109 | 0.1217 | 0.0880 | |
| g. e + f | 0.3848 | 0.1293 | 2.0798 | 0.3386 | 0.0092 | 0.3389 | 0.4958 | 0.1220 | 0.0881 | |
| h. e × f | 0.0000 | 0.0010 | 0.6317 | 0.0177 | 0.0000 | 0.0022 | 0.0427 | 0.0000 | 0.0000 | |
| i. frequency of puctuation after w / frequency of puctuation before and after w | 0.0011 | 0.0290 | 0.7143 | 0.2541 | 0.0014 | 0.9652 | 0.9769 | 0.0030 | 0.0011 | |
| j. frequency of puctuation before w+1 / frequency of puctuation before and after w+1 | 0.9710 | 0.2857 | 0.7459 | 0.9986 | 0.0348 | 0.0231 | 0.9970 | 0.9989 | 0.2677 | |
| k. i + j | 0.9721 | 0.3147 | 1.4602 | 1.2527 | 0.0362 | 0.9883 | 1.9739 | 1.0019 | 0.2688 | |
| l. i × j | 0.0010 | 0.0083 | 0.5328 | 0.2538 | 0.0000 | 0.0223 | 0.9739 | 0.0030 | 0.0003 | |
| Unmodified | El | gran | elefante | rompía | la | ventana | pequeña | en | el | jardín. |
| Space prominence modified as in h × 10 | El | gran | elefante | rompía | la | ventana | pequeña | en | el | jardín. |
| Space prominence modified as in l | El | gran | elefante | rompía | la | ventana | pequeña | en | el | jardín. |

| | the | big | elephant | was | breaking | the | small | window | in | the | garden |
|---|---|---|---|---|---|---|---|---|---|---|---|
| a. lexical category of next word | adjective | noun | verb | verb | det. | adjective | noun | prep. | det. | noun | |
| b. frequency of word cooccurance with $a$ | 1,002 | 684 | 1 | 1,906 | 5 | 1,002 | 307 | 6 | 6,874 | 24,053 | |
| c. frequency of word cooccurance with not $a$ | 34,751 | 136 | 5 | 2,733 | 24 | 34,751 | 82 | 15 | 11,111 | 11,700 | |
| d. lexical category size | 13,647 | 48,048 | 47,175 | 41,297 | 13,647 | 48,048 | 42,486 | 41,297 | 48,048 | | |
| e. not lexical category size | 34,924 | 523 | 1,396 | 7,274 | 34,924 | 523 | 6,085 | 7,274 | 523 | | |
| f. $c \frac{b+c}{d+e}$ | 10,045.5 | 811.2 | 5.8 | 4,505.7 | 24.7 | 10,045.5 | 384.8 | 18.4 | 15,291.6 | 35,368.0 | |
| g. $d \frac{b+c}{d+e}$ | 25,707.5 | 8.8 | 0.2 | 133.3 | 4.3 | 25,707.5 | 4.2 | 2.6 | 2,693.4 | 385.0 | |
| h. log–likelihood, $2\left(b \log\left(\frac{b}{e}\right) + c \log\left(\frac{d}{f}\right)\right)$ | 7,092.1 | 221.7 | 13.1 | 5,745.5 | 28.7 | 7,092.1 | 151.6 | 16.8 | 8,902.6 | 26,641.4 | |
| i. $h^{-\frac{1}{3}}$ | 0.052 | 0.165 | 0.424 | 0.056 | 0.327 | 0.052 | 0.188 | 0.390 | 0.048 | 0.0335 | |

Unmodified — The big elephant was breaking the small window in the garden.

Space prominence modified after the word as in $h$ — The big elephant was breaking the small window in the garden.

FIG. 7F

1010 → Mr. Sherlock Holmes, who was usually very late in the mornings, save upon those not infrequent occasions when he was up all night, was seated at the breakfast table. I stood upon the hearth-rug and picked up the stick which our visitor had left behind him the night before. It was a fine, thick piece of wood, bulbousheaded, of the sort which is known as a "Penang lawyer." Just under the head was a broad silver band nearly an inch across. "To James Mortimer, M.R.C.S., from his friends of the C.C.H.," was engraved upon it, with the date "1884." It was just such a stick as the old-fashioned family practitioner used to carry – dignified, solid, and reassuring.

FIG. 8A

1012 → Mr. Sherlock Holmes, who was usually very late in the mornings, save upon those not infrequent occasions when he was up all night, was seated at the breakfast table. I stood upon the hearth-rug and picked up the stick which our visitor had left behind him the night before. It was a fine, thick piece of wood, bulbousheaded, of the sort which is known as a "Penang lawyer." Just under the head was a broad silver band nearly an inch across. "To James Mortimer, M.R.C.S., from his friends of the C.C.H.," was engraved upon it, with the date "1884." It was just such a stick as the old-fashioned family practitioner used to carry – dignified, solid, and reassuring.

FIG. 8B

1015 → Mr. Sherlock Holmes, who was usually very late in the mornings, save upon those not infrequent occasions when he was up all night, was seated at the breakfast table. I stood upon the hearth-rug and picked up the stick which our visitor had left behind him the night before. It was a fine, thick piece of wood, bulbousheaded, of the sort which is known as a "Penang lawyer." Just under the head was a broad silver band nearly an inch across. "To James Mortimer, M.R.C.S., from his friends of the C.C.H.," was engraved upon it, with the date "1884." It was just such a stick as the old-fashioned family practitioner used to carry – dignified, solid, and reassuring.

FIG. 8C

1016 → Mr. Sherlock Holmes, who was usually very late in the mornings, save upon those not infrequent occasions when he was up all night, was seated at the breakfast table. I stood upon the hearth-rug and picked up the stick which our visitor had left behind him the night before. It was a fine, thick piece of wood, bulbousheaded, of the sort which is known as a "Penang lawyer." Just under the head was a broad silver band nearly an inch across. "To James Mortimer, M.R.C.S., from his friends of the C.C.H.," was engraved upon it, with the date "1884." It was just such a stick as the old-fashioned family practitioner used to carry – dignified, solid, and reassuring.

FIG. 8D

1014 → Mr. Sherlock Holmes, who was usually very late in the mornings, save upon those not infrequent occasions when he was up all night, was seated at the breakfast table. I stood upon the hearth-rug and picked up the stick which our visitor had left behind him the night before. It was a fine, thick piece of wood, bulbous headed, of the sort which is known as a "Penang lawyer." Just under the head was a broad silver band nearly an inch across. "To James Mortimer, M.R.C.S., from his friends of the C.C.H.," was engraved upon it, with the date "1884." It was just such a stick as the old-fashioned family practitioner used to carry – dignified, solid, and reassuring.

FIG. 8E

User defined physical adjustment range: 0-20%

| 310 → CIM | 1.00 | 0.75 | 0.50 | 0.25 | 0.00 |
|---|---|---|---|---|---|
| 910 → horizontal scaling | B<br>0% | B<br>-5% | B<br>-10% | B<br>-15% | B<br>-20% |
| 912 → vertical scaling | B<br>0% | B<br>-5% | B<br>-10% | B<br>-15% | B<br>-20% |
| 914 → saturation | B<br>0% | B<br>-5% | B<br>-10% | B<br>-15% | B<br>-20% |
| 916 → weight | B<br>+10% |  | B<br>0% |  | B<br>-10% |
| 918 → outline stroke | B<br>+20% | B<br>+15% | B<br>+10 | B<br>+5 | B<br>+0 |
| 920 → slant | *B*<br>+20% | *B*<br>+15% | *B*<br>+10 | *B*<br>+5 | B<br>+0 |
| 930 → lexical unit spacing (word spacing) | of the<br>+20% | of the<br>+15% | of the<br>+10% | of the<br>+5% | of the<br>0% |
| 940 → character spacing (letter spacing; kerning) | pulling<br>+20% | pulling<br>+15% | pulling<br>+10% | pulling<br>+5% | pulling<br>0% |

FIG. 9B

1018 →
elephant   garden
elephant   garden
elephant   garden
elephant   garden
elephant   garden

FIG. 11A

1020 →
elephant   garden
el·phant   ga·den
el·ph·nt   g··den
e··ph·nt   g··de·
e··p··nt   g··d··

FIG. 11B

1022 →
elephant   garden
elphant    gaden
elphnt     gden
ephnt      gde
epnt       gd

FIG. 11C

1030 → Harry is amazed. The crow is in this beautiful garden. Every one else thinks this is normal.

FIG. 12A

1032 → Harry is amazed. The crow is in this beautiful garden. Ev-ery one else thinks this is normal.

FIG. 12B

1034 → Harry is amazed. The crow is in this beautiful garden. Every one else thinks this is normal.

FIG. 12C

1036 → Harry is amazed. The crow is in this beautiful garden. Every one else thinks this is normal.

FIG. 12D

1038 → Harry is amazed. The crow is in this beautiful garden. Every one else thinks this is normal

FIG. 12E

1040 → Harry is amazed. The crow is in this beautiful garden. Every one else thinks this ### is #normal

FIG. 12F

1042 → Harry is amazed. The crow is in this beautiful garden. Every one else thinks this is normal.

FIG. 12G

1044 → Harry is amazed. The crow is in this beautiful garden. Every one else thinks this is normal.

FIG. 12H

1046 → Harry is amazed.
The crow is in this beautiful garden.
Every one else thinks this is normal.

FIG. 12I

SYSTEM, PLUG-IN, AND METHOD FOR IMPROVING TEXT COMPOSITION BY MODIFYING CHARACTER PROMINENCE ACCORDING TO ASSIGNED CHARACTER INFORMATION MEASURES

CROSS-REFERENCE TO RELATED APPLICATIONS

This application claims benefit of priority under 35 U.S.C. 119(e) to U.S. Provisional Application No. 60/995,771 entitled "System and Method for Improving Text Composition By Varying Character Prominence According to Assigned Character Information Measures" and filed on Sep. 28, 2007 the entire contents of which are incorporated by reference.

FIELD OF THE INVENTION

The present invention relates to electronic word processing and typographic layout, and in particular to the composition of textual material for printing, display, or the like.

BACKGROUND OF THE INVENTION

Word processors and typesetting layout programs are used to create, edit, store, and output textual documents on a variety of digital computer applications. These computers include, but are not limited to, large mainframes connected to terminals, alone desktop or laptop personal computers, and handheld communication or digital devices. A publisher or designer may specify a format for a text including: typeface, font size, lines per page, the line length, and text margins (left, right, top, or bottom), text density (the ratio of ink to background, e.g., black ink on white), and text and background color. One of the goals of a word processor or layout program is to compose text for the specified format for a variety of output forms such as printing, display on a computer screen, or electronic storage or presentation such as on the World Wide Web. A second goal of word processors or layout programs is to make the text legible—quick and easy to read and comprehend—often within the physical constraints of the media such as the size of the page or screen, or positioning of other elements such as pictures or other text displayed on the page, for example different articles in a newspaper or magazine. A third goal of word processor and layout programs is to make text readable—attractive and pleasurable or interesting to read—by positioning the characters of a text to maintain an evenness or uniformity in various characteristics such as the number of lines per page, the line length, and text margins (left, right, top, or bottom), and text density (the ratio of ink to white space, including controlling line endings and use of hyphenation). A fourth goal is to make text economical—a desired number of lines or pages, e.g., minimum, maximum, or specified number, for the specified format without sacrificing legibility or readability.

In most word processing or layout application, the lines per page, line length, and margins are fixed for a particular unit of text and text density is manipulated to create a text output that is both legible (comprehensible) and readable (aesthetically appealing). Often there is a trade-off in text density between factors that enhance legibility and factors that enhance readability such as uniformity. Readability is usually favored by compositors when setting text. For example, text that is too densely or too sparsely positioned within the space available is difficult to read, but can appear highly uniform. There can also be trade-offs in text density for different aesthetic factors such as maintaining uniform word spacing from line to line (but leaving the right margin irregular or ragged from line to line) verses maintaining a uniform (justified) right margin (but leaving the between word spacing variable from line to line). This is a natural trait of written language because in most languages text units such as words and sentences have variable lengths even when the space allotted is uniform. Thus, there is a variable amount of space available from line to line, and that variable space must be distributed somewhere—either at the ends of lines or within lines. One of the typographic problems faced by either automatically or manually positioning text in a word processor or layout program is how to distribute the text and space such that both legibility and readability are high.

One critical factor that affects the readability of text is the method used to determine line endings because it determines the variation in white space from line to line. A common method used by many word processors is a first-fit approach—also called single line composition—in which the break points for each line are determined one after the other; however, no breakpoint is changed once it has been selected. Another common method is a total-fit line breaking approach—also called multi-line or paragraph composition—developed by Donald Knuth and Michael Plass. This method considers all possible breakpoints in a paragraph and selects the combination of breakpoints with the most globally pleasing result. This is accomplished using a method that determines the badness of each line break by assigning penalties to line breaks that result in spaces that are too large or too small or have other undesirable characteristics such as successive hyphens on adjacent lines. The method minimizes the sum of squares of the badness to achieve a global, paragraph-wide set of line breaks. This method of optimizing line breaks across multiple-lines of a paragraph is used in both free programs such as TeX and the GNU fmt command line utility and commercial programs such as Adobe InDesign.

U.S. Pat. No. 5,724,498 to Nussbaum provides an improved method for justifying text. Conventional methods justify text uniformly by squeezing or stretching the characters and word-spaces, which maintains density within a line, but is often undesirable because density varies noticeably between lines, especially adjacent lines. Nussbaum adds random variation in letter width to conceal these modifications to improve the aesthetic appearance by minimizing the appearance of the character width modifications.

U.S. Pat. No. 7,069,508 to Bever and Robbart provides a method for optimal spacing for readability and comprehension. Bever and Robbart use a library of key words and punctuation to train a neural network to recognize characteristics that recognize phrase boundaries in text and adjust the space size of every between word space according to the likelihood that the space is the end of a phrase.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The invention provides a computer implemented system, plug-in application and method for composing a formatted text input to improve legibility, readability and/or print economy while preserving the format of the text input and satisfying any user selected aesthetic constraints.

This is accomplished by reading in blocks of text input having defined characters including letters and punctuation in a given input format. A language unit including a lexical unit (at least one word and surrounding punctuation), a lexical sub-unit, a subset of punctuation or other defined units in some foreign language in the text input is examined and an information measure (IM) is assigned to each character in the language unit indicating the predictability of that character to differentiate the language unit from other language units. The process is repeated for at least a plurality of units and typically until all the text input in the block has been analyzed and information measures assigned to all of the characters. An adjustment to a physical feature is determined for each character in the processed language units to modify the visual prominence of that character according to the values of the assigned information measures and a permitted range of physical variation, defined by either a specified parameter range and/or excess line space (distributed at various levels as "available space") for the block. The adjustments are applied to each character to compose the text input consistent with the input format.

In a typical configuration, the character prominence modification program is provided as a plug-in (or extension) that receives the text input and the initial or default values for a physical feature(s) for each character from a composition program (e.g., text editor or layout program) and returns adjusted values for the physical feature(s) for each character for application by the composition program. The composed text input is written to a storage device, printed onto a readable medium and/or displayed on a visual display unit. In general, this method improves text composition by increasing the visual prominence of characters or character features that are more informative and decreasing the visual prominence that are less informative. A specific manner of adjustment will depend on the aesthetic constraints of text composition, e.g., improve legibility without compromising the format or sacrificing economy, improving print economy without sacrificing legibility or readability, providing local control of line endings to improve readability, etc. To this end, the plug-in enables the user to select certain "aesthetic constraints" such as target length, line variation, frequency of hyphenation, goodness of line endings, etc. and any applicable parameters. The plug-in in turn computes the CIMs and makes the adjustments to the physical feature(s) of each character subject to these constraints. Different "wrappers" are implemented to apply the "core" character prominence program to the text input depending upon the user selected aesthetic constraints.

In an embodiment, a combined IM (CIM) is computed for each character based on one or more levels of lexical, extra-lexical, sub-lexical and/or sub-character informativeness. The individual IMs compute informational distinctiveness in the visual, phonic, and/or lexical features of the text at one or more of these representational levels. The information metrics (IMs) do not define traditional or formal linguistic features such as "phrases" or "clauses." Sequences of the same phrase type vary greatly in their informativeness, and different phrase types can carry identical amounts of information, mathematically defined. The adjustments to the physical features are then based on the values of the CIMs, subject to user-specified form constraints, such as text length and feature variability. Lexical informativeness includes both lexical frequency and inter-lexical similarity IMs. Extra-lexical informativeness includes both lexical sequence and statistically determined lexical category IMs. Sub-lexical informativeness includes character sequence, sub-lexical frequency, phonological prominence and orthographic pattern IMs. Sub-character informative includes a character feature IM.

In another embodiment, one or more physical features of each character can be adjusted to modify visual prominence according to the values of the assigned information measure in many ways, for example by scaling: (1) the horizontal (or vertical size) of the character including punctuation marks and spaces between words, (2) the space assigned to immediately precede and follow the character (i.e., kerning the letterspace), (3) character components such as stems, loops, serifs, radicals, accent marks or special strokes, (4) the contrast between the character's foreground and background (e.g., darkness of ink against the lightness of a page), and (5) temporal breaks in text when text is streamed to a display for presentation in chunks or units when display space is limited such as theater screen, computer display, television, mobile device, webpage, or marquee. Scaling can be achieved by mapping the range of IM or CIM values in a given text input to the permitted range of physical variation to define a transformation from a CIM value to an adjustment for the physical feature. A particular adjustment is found by applying the transform to each character CIM or by using the value to select from a set of predefined or prescaled fonts or glyphs. The permitted range of physical variation may have to be adjusted and the process iterated to achieve specific goals or constraints of a given composition, e.g., achieving or maintaining a certain length for the text block. A particular application may adjust only a single physical feature, e.g., horizontal size of the character or it may adjust multiple physical features, e.g., horizontal size of a character and between character spacing (kerning). Adjustment of multiple physical features may be either independent or dependent of each other.

The character prominence modifications in the invention can be used dynamically to present text in an aesthetically appealing format under a variety of conditions such as those that require text expansion, compression, or maintenance of a predetermined text length. These character prominence modifications are flexible and can be used for local text composition purposes, such as improving the informativeness of characters at critical reading transitions such as line, column, and page breaks, including minimization of hyphens to improve legibility or intelligent use of hyphens to improve readability by minimizing local variations in text density. Similarly, the character prominence modifications can be used for global text composition purposes such as controlling physical length on a column, page, section, chapter, or an entire text, including respecting typographic or stylistic constraints on legibility and readability such as minimizing widows (paragraph endings at the beginning of text block) and orphans (paragraph beginnings at the end of a text block) across multiple columns, pages, or text blocks. The character prominence modifications can be used selectively or globally across an entire text to constrain it to fill a predetermined number of pages such as a certain number of signatures for printing and binding.

The system can be applied automatically to any language or text-genre with words and characters that employ subcomponents, such as letters in the Roman alphabet and character strokes in Chinese. Information metrics can be extracted by statistical comparison of the informativeness of each (sub) unit across texts and coded language corpora.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7A through 7H are tables illustrating examples of the individual IMs shown in FIGS. 4A-4I;

FIGS. 8A-8E illustrate a portion of text formatted in accordance with the present invention to globally control composition;

FIGS. 9A and 9B are diagrams of an embodiment illustrating the translation of the CIM into a physical parameter space of the character or character feature;

FIGS. 11A-11C are diagrams illustrating the progressive use of a CIM to achieve informational compression of text;

FIGS. 12A-12I are diagrams illustrating use of a CIM to locally control composition to minimize hyphenation or variation in line length.

DETAILED DESCRIPTION OF THE PREFERRED EMBODIMENT

Figure 1:
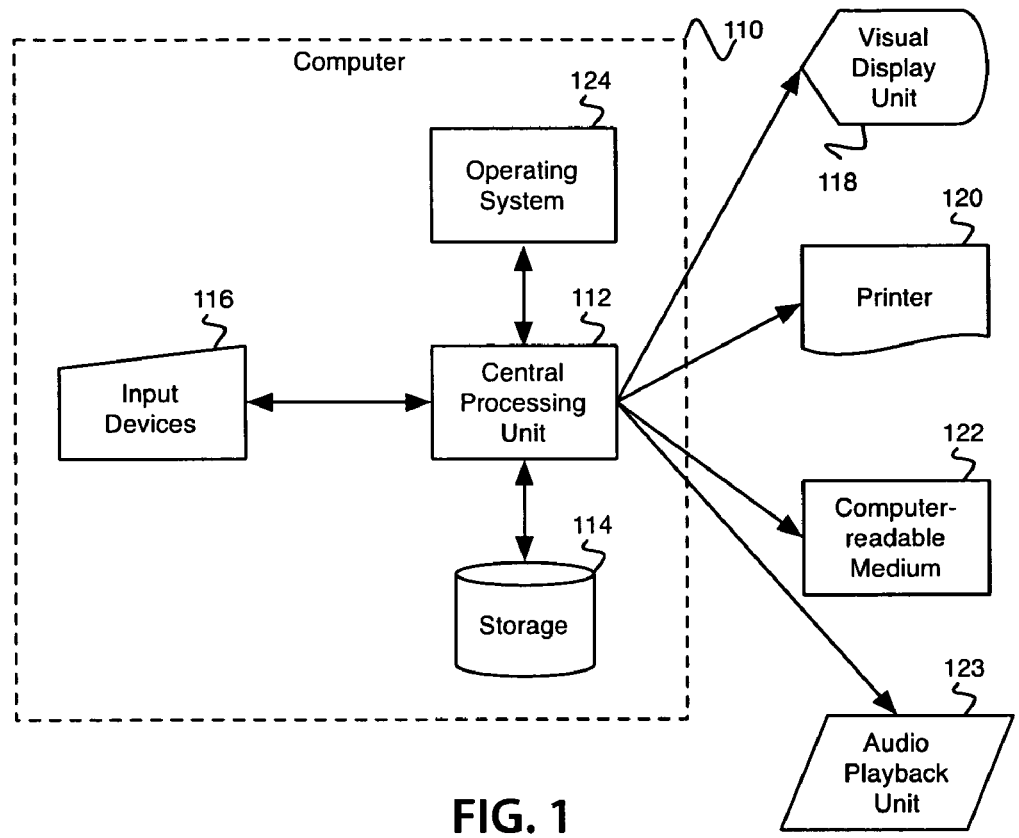
FIG. 1 is a block schematic diagram of computer system embodying the present invention for composing text for distribution to visual displays, printers or a storage device.

According to the preferred embodiments of the present invention, a computer-implemented method, a plug-in application for use with a computer system, or a computer system modify the visual prominence of text characters based on individually assigned information measures to improve text composition, including the legibility and readability of the text and economy of print or display, while preserving the format of the text input and satisfying all user selected aesthetic constraints. The present invention applies to any arrangement of text, such as displayed electronically on computer display, printed to hard copy, written to a computer readable medium, or any other arrangement or presentation of text known in the art or developed in the future such as text-to-speech audio playback.

Reading is accomplished by making eye movements that are both stochastic and intentional. Written text varies in the informativeness of its characters, words, and sentences to differentiate the language unit from other language units. Good readers ignore uninformative characters or words and seek out informative characters and words by their choices of intentional eye movements. The present invention (a) assigns an information measure to each character in a language unit indicating the predictability of that character to differentiate the language unit from other language units and (b) arranges the text input by adjusting physical features of each character according to the assigned information measure to modify the visual prominence of the character for a formatted text input. A "language unit" can be defined as a 'lexical unit' (at least one word and the surrounding punctuation), a 'sub-lexical unit' (e.g., a word by itself, a prefix or suffix to a word, etc), only punctuation or a subset of punctuation (e.g., between word spaces) or a different unit as needed for a particular language (some languages do not have lexical units). For example, a particular application may only require modifying the prominence of letters in which case the language unit may be defined to only include individual words or it may only require modifying the prominence of between word spaces in which case the language unit may be defined to only include between word spaces. The most general case is to define the language unit as lexical units (e.g., in "example," the lexical unit includes the preceding space, the letters in the word, the following comma, and the space following the comma). This treats all letters and punctuation as characters whose prominence is modified by adjusting physical features of the character according to the informativeness of the character.

The present invention is both universal and specific: it is universal in that it can apply automatically to any language with a written or other symbolic system for representing the language. This offers a single method for increasing legibility and readability and makes it possible in principle to transfer formatting principles that increase legibility and readability from one symbol system to others. It is specific in that it can apply to selected texts or subset genres of a language (e.g., medical texts, government publications, or children's books) assessing the informativeness of characters in each specific domain, thereby further improving legibility and readability.

A block schematic diagram of a typical computer system required to implement the preferred embodiment of the invention is shown in FIG. 1. A computer system 110 consists of a central processing unit (CPU) 112, controlled by an operating system 124, connected to other peripheral or integral equipment: storage 114; one or more input devices 116 such as a keyboard with or without a mouse, a scanner or devices that capture spoken (voice) input for conversion to electronic or printed text; and output devices such as a visual display unit (VDU; computer monitor or screen) 118, a printer 120, a separate storage device or computer-readable medium 122, or audio playback unit 123. Text input may be input to the system and stored in storage 114 via one of the input devices, a tangible media (e.g., text input on a disk) or via the Internet, for example. The computer system's storage may consist of random access memory (RAM), read only memory (ROM), and magnetic or optical storage media such as disk drives, CD ROMs, DVDs, or the like. The computer system may be for example, a mainframe; a personal computer such as a Macintosh™, International Business Machines (IBM™), or IBM-compatible personal computer; or personal communication device such as a mobile phone, ebook reader, personal data assistant (PDA), email, or webbrowsing device, or another kind of computer, multi-media, or text display device. The computer system or any part of it may be shared within local area networks, wide area networks, the Internet, or any other system of linked computer networks.

Figure 2A:
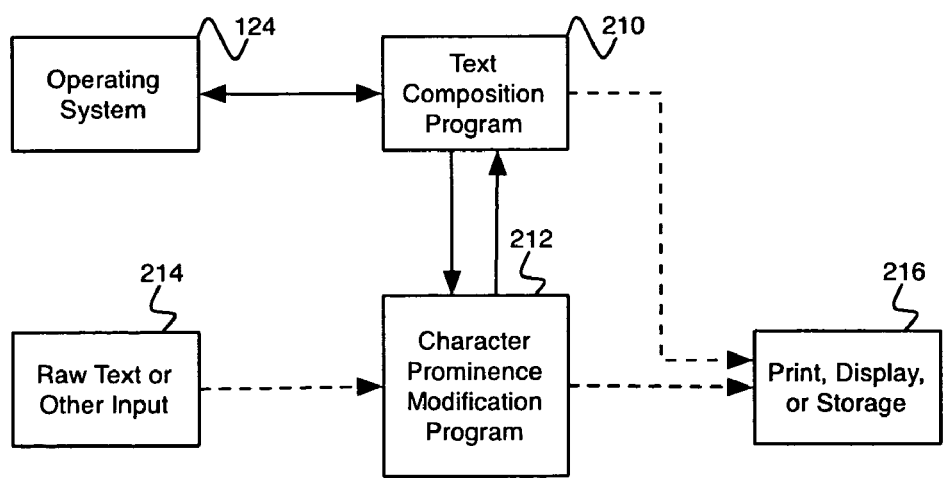
FIGS. 2A and 2B are respectively a structure of data and programs used to implement an embodiment of this invention and a flowchart of the core character prominence modification program in accordance with the present invention.

FIG. 2A broadly illustrates the typical structure of data and programs (applications) within the storage 114 that are used by the CPU 112 to implement the preferred embodiment of this invention. This data includes an operating system 124 and a text composition program 210 such as a text editor (or word processor), a layout program or possibly a Web Browser. The operating system 124 may be Macintosh OS X™, Microsoft Windows™, Linux or another operating system. An example of a text editor is Microsoft Word™ and examples of layout programs include QuarkXPress™ and Adobe InDesign™; however, those skilled in the art will appreciate that the spirit and scope of this invention is not limited to use within a specific program or operating system, but is intended for use in any computer program embodied in a computer readable storage medium used to compose, edit, format, or arrange text for print or display.

In an embodiment, a character prominence modification program 212, which typically includes a core modification program and a wrapper(s) that allows for selection of and compliance with aesthetic constraints, can operate as a plug-in application to work with one or more text composition programs 210. The character prominence modification program 212 is embodied as computer executable instructions in a computer-readable media such as a disk, memory or integrated circuit (IC) chip. This embodiment uses the built-in text composition abilities of such programs to flow text once character prominence in the form of adjusted values for one or more physical features has been assigned. For example, the plug-in replaces the uniform values for the physical feature originally assigned by the text composition program (e.g., uniform width, contrast, etc.) with non-uniform values assigned based on each character's informativeness to improve readability, legibility and/or print economy while preserving the text format.

In other embodiments, raw text or some other format such as a spoken voice 214 can be used as input to the character modification program 212, which interacts directly with the operating system 124 to output text to the text composition program 210 or to another program for print, display, or storage 216. In the plug-in configuration, the text editor/layout program will maintain the input text format regardless of the adjustments to the characters. In a stand-alone design, the program would itself maintain the input text format.

Figure 2B:
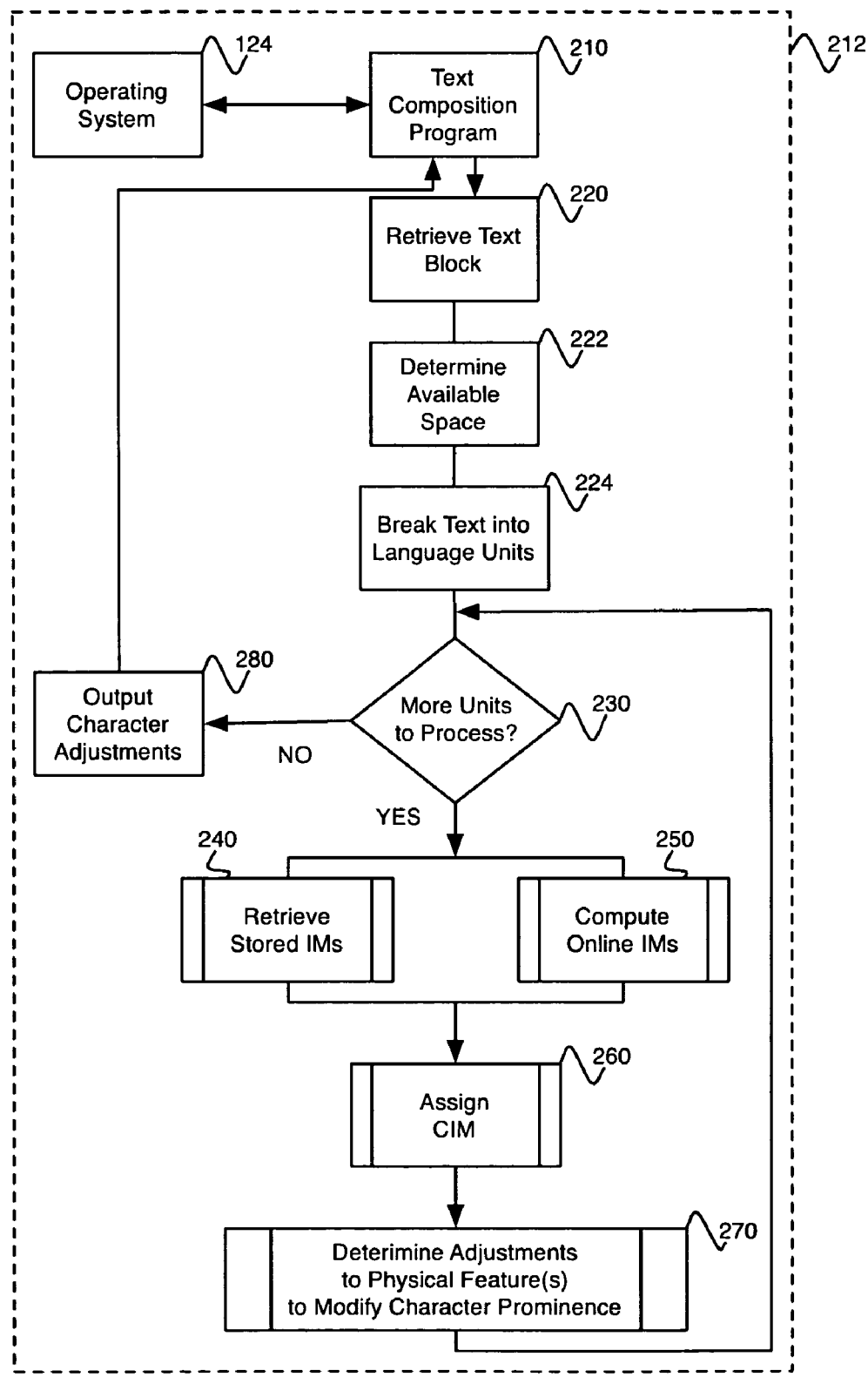

As illustrated in FIG. 2B, in the plug-in configuration character prominence modification program 212 works with one or more text composition programs 210 (editing, word processing, or text layout) that interact with operating system 124 and operates in several steps. The "wrapper" is not depicted in this figure, only the "core" modification program. First, the plug-in retrieves a block of text (e.g., word, sentence, paragraph, column, chapter, etc. of defined characters including letters and punctuation in a given input format) and a list of uniform values for the physical feature(s) from the word processor or layout program (step 220). From this text block and the input format of the text block (e.g., the font size, margins, column width, etc.), determined by the text editor or layout program, the plug-in determines available line space (i.e., the amount of additional space that can be added to a line without adjusting the margin or wrapping the line) for each line in the text block (step 222). Excess space is by definition computed on a line-by-line basis but can be summed or divided over any relevant interval to determine available space for that interval. Next the plug-in breaks the retrieved text block into language units (step 224). The plug-in processes each language unit in the retrieved text block until the entire text block has been tokenized (separated into language units) and processed (step 230).

Figure 3A:
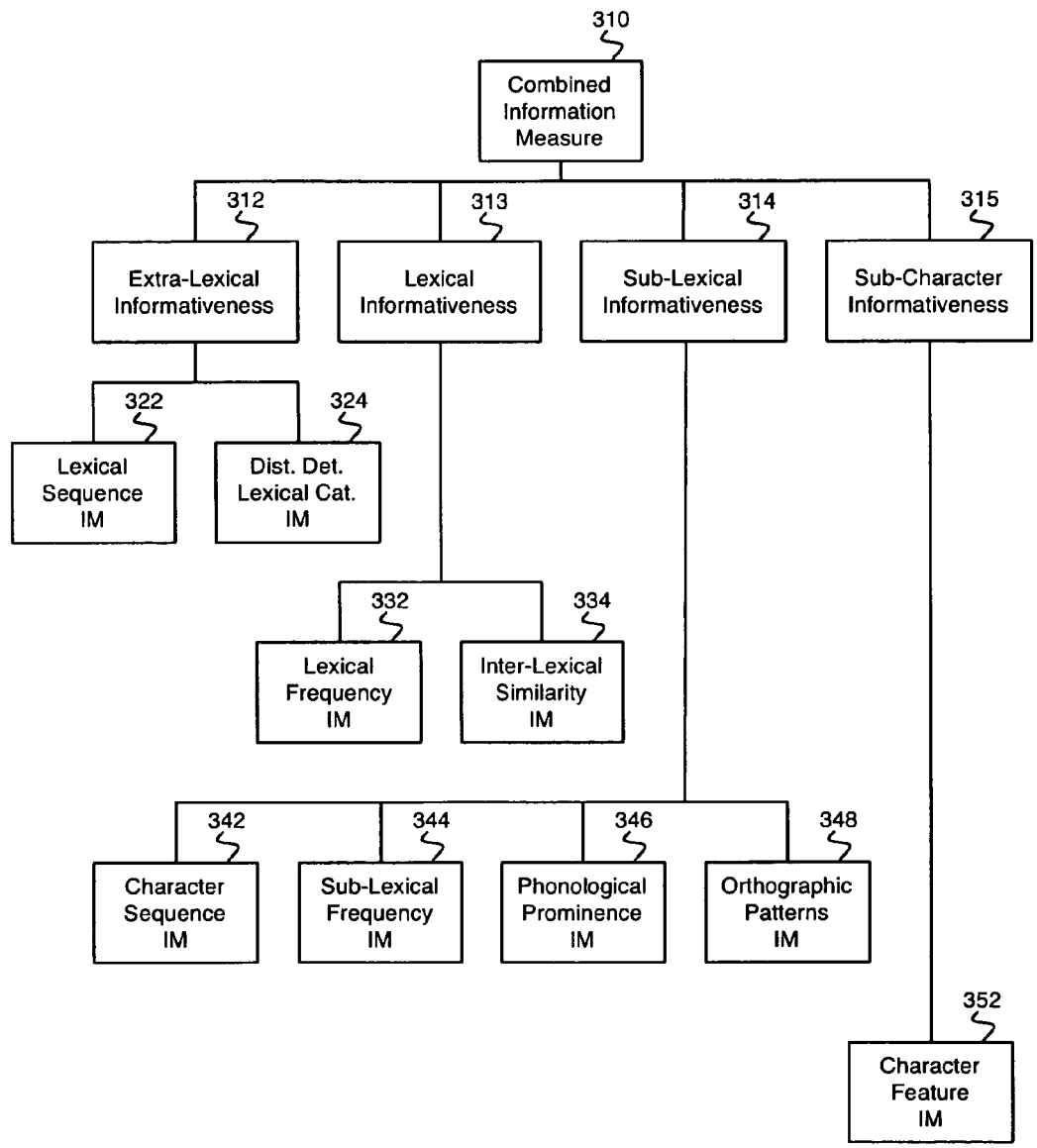
FIGS. 3A and 3B are respectively a diagram illustrating an embodiment of multi-level representation of individual information measures (IMs) for a combined information measure (CIM) and a flowchart of the steps for computing the information measures at each representation level.
Figure 3B:
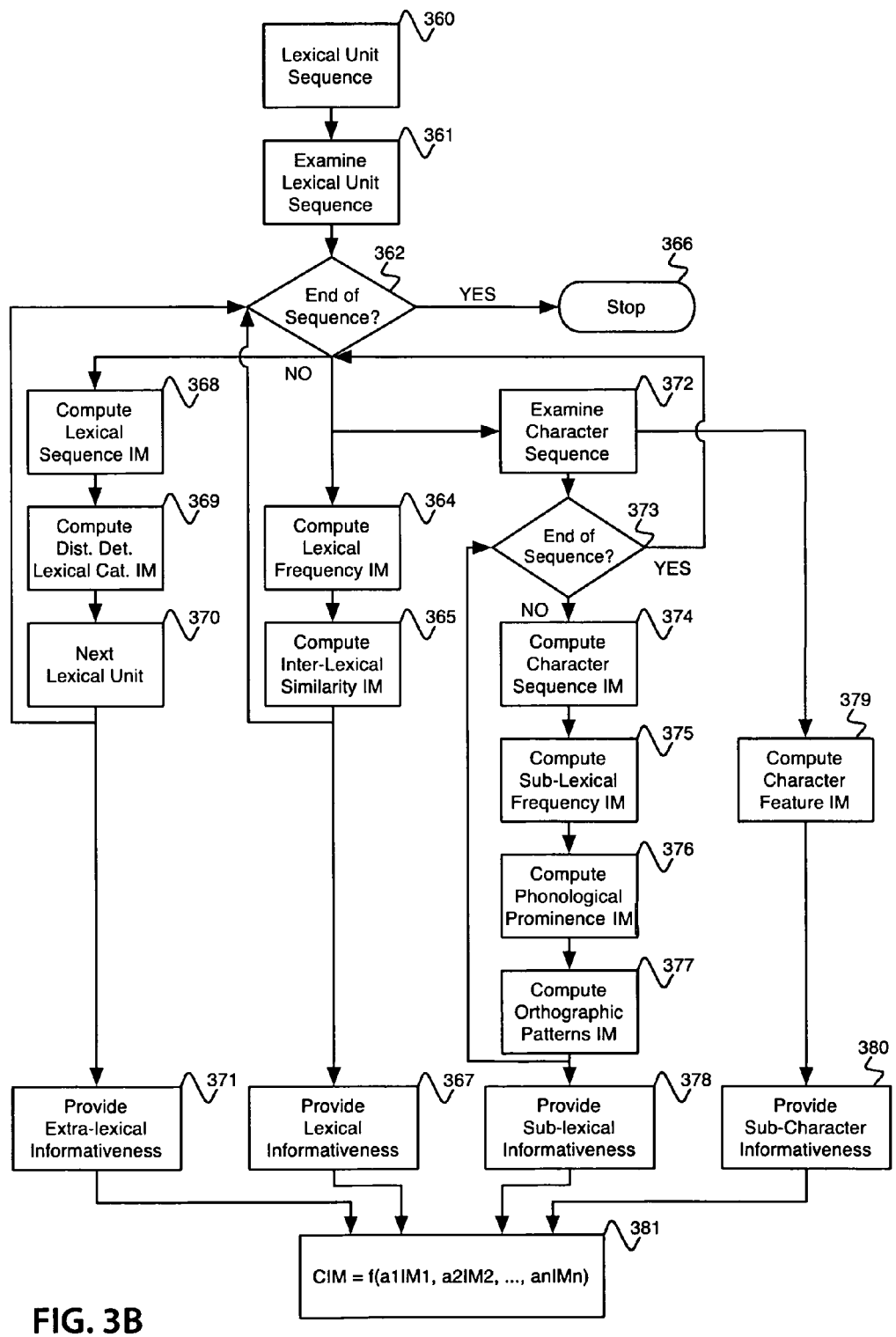

The plug-in processes each language unit by retrieving (looking up) one or more stored information measures (IMs) for that language unit, pre-computed using an offline corpus (step 240), or by computing online one or more information measures (IMs) (step 250) for various levels of information present in the text block (see FIG. 3B). A "corpus" may constitute pure text or public dictionaries or treebanks in which each sentence has been annotated with syntactic structure. The plug-in assigns a combined measure or CIM that integrates the combined informativeness of the text across a plurality of individual information measures (shown in greater detail in FIG. 5) (step 260). Next, the plug-in determines an adjustment to a physical feature to modify the prominence of each character (step 270) in the text as a function of its combined informativeness. For example, the plug-in may adjust the uniform values of the physical features provided for all characters to increase the prominence of more informative characters and decrease the prominence of less informative characters.

The plug-in takes into account the permissible range of modification as defined by a user-specified parameter range and/or the excess line space in step 222, which may be distributed as available space across language units as a limit on the range of modification of each unit, such as by adjusting one or more physical features (e.g., width, height, contrast, etc) of each character (see FIGS. 6A-B, 9, 10 and 13 for details). In alternate embodiments, the permissible range may be a specified range of physical variation or excess line space may be used exclusively to control the amount of adjustment to a physical feature or the excess line space can be used as a limit on the specified range of adjustment.

The plug-in returns the list of adjusted values of the physical feature(s) for each character back to the text editing/layout program 210 (step 280), which in turn composes the text using the adjusted values for display, print or other output.

An embodiment of a computer system for composing text includes an input device for providing a text input having characters including letters and punctuation including spaces and an output device. One or more storage devices are configured to store (1) a first sequence of computer instructions to create, edit and store the text input and output a composed text input that is visually rendered on the output device, said instructions generating successive blocks of text input in a format and a list of values for one or more physical features for the characters and (2) a second sequence of computer instructions that process the successive blocks of text input to return a list of adjusted values for the text input that increase the visual prominence of characters that are more informative and decrease the visual prominence of characters that are less informative consistent with the format in the composed text output. A processor is configured to execute the first and second sequences of computer instructions.

Without loss of generality, the character prominence modification program will now be described for the case in which the language unit includes lexical units, e.g., at least one word and the punctuation before and/or after the word including any spaces. It will be understood that the method is applicable to other definitions of language unit as described above.

Character Information Measures (IMs) and Combined IM (CIM)

FIG. 3A illustrates an embodiment of a multi-level representation of a text-based Combined Information Measure (CIM) 310 that measures informativeness of characters, including sequences of characters or parts of characters, across one or more IMs that represent informational features: extra-lexical 312, lexical 313, sub-lexical 314, and sub-character information 315. Each IM is computed for each character in a language unit indicating the predictability of a character (e.g., letters or punctuation) to differentiate the language unit from other language units. The predictive capability of a character is greatly enhanced by combining multiple, different IMs. The IMs do not define traditional or formal linguistic features such as "phrases" or "clauses." Sequences of the same phrase type vary greatly in their informativeness, and different phrase types can carry identical amounts of information, mathematically defined.

Written language conveys information to the reader in multiple levels of representation. For example, lexical units are a basic unit of written language and can vary in their informativeness, i.e., some words are more informative than others 313. Similarly, sequences of words vary in their informativeness as do other extra-lexical symbols such as punctuation 312. Likewise, lexical units are often composed of sequences of lexical subunits: characters (e.g., letters), and these sequences vary in informativeness 314. Finally, the characters themselves are composed of strokes and gaps (e.g., stems, loops, or dots) that vary in their informativeness 315. Because the purpose of written language is to use visual symbols to convey information about the sound or meaning of lexical units each of these levels in the hierarchy of language vary in the psychological, linguistic, and informational distinctiveness of the visual, phonic, and lexical features of the text. Nine individual IMs 322-352 are described in detail below.

As detailed below following the description of each IM, FIG. 3B illustrates a flowchart of the steps for an embodiment of computing the information measures at each representation level. This figure illustrates the hierarchical nature of the CIM and how through iteration, computation of the IMs at each level of representation (extra-lexical 312, lexical 313, sub-lexical 314, and sub-character 315) is processed for an entire text block. The individual IMs 322-352 are described here briefly and then in more detail in the sections below. The lexical sequence IM 322 computes the informativeness of extra-lexical characters such as punctuation at the boundary between lexical units. The distributionally determined lexical category IM 324 computes the serial predictability of a given lexical unit based on its lexical category (e.g., noun, verb, etc.) given the lexical category of an adjacent lexical unit (e.g., verb, noun, etc.). The lexical frequency IM 332 computes informativeness based on the frequency of a lexical unit (word) in a selected corpus. The inter-lexical similarity IM 334 identifies how easily lexical information units (e.g., words) are confused with other similar lexical units. The character sequence IM 342 computes the informativeness of a character or n-gram (series of two, three, etc. characters) based on its serial position within a lexical unit or based on its serial predictability within the language—the likelihood of a character or n-gram preceding or following another. The phonological prominence IM 346 computes the informativeness of sequences of characters when the lexical unit is pronounced. The orthographic pattern IM 348 computes the informativeness of the character to sound correspondence in a lexical unit. A character feature IM 352 computes the informativeness of sub-character features such as strokes or counters.

Lexical Informativeness 313
Lexical Frequency IM

The lexical frequency IM 332 computes informativeness based on the frequency of a lexical unit (word) in a selected corpus. The frequency of lexical units has been shown repeatedly to be a fundamental variable controlling their informativeness, and thus the informativeness of all the characters within each lexical unit. The straightforward implementation of a lexical frequency IM is to assign character prominence of all lexical units in terms of a continuous frequency variable, which affects the prominence of every character in that lexical unit. The background frequency information can be compiled from a large corpus, or from publicly available dictionaries (step 240 in FIG. 2B). It can also be derived from a specific corpus to determine an IM for that specific implementation, for example controlling character informativeness of medical or other technical terms could vary when such terms are used in different contexts such as a newspaper; a scientific, legal, or technical journal; or a medical textbook. The frequency could also be computed online (step 250 in FIG. 2B) for the text block in question, using for example a chapter or book itself as a corpus.

Figure 4A:
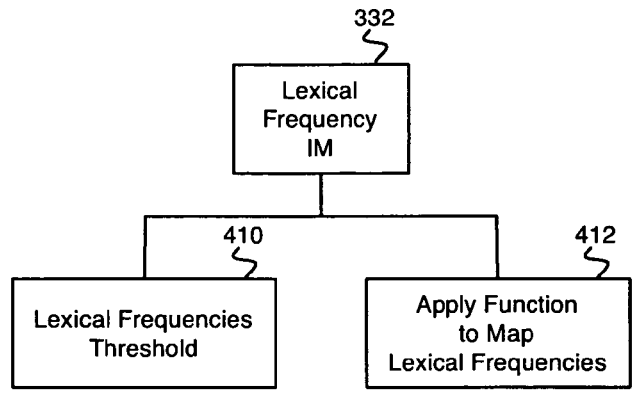
FIGS. 4A through 4I are embodiments of the lexical frequency, inter-lexical similarity, lexical sequence, distributionally determined lexical category, character sequence, sub-lexical frequency, phonological prominence, orthographic patterns, and character feature IMs, respectively.

There is some evidence that frequency is not a continuous psychological variable, but rather speakers of a language recognize very frequent words in ways different from other words. Thus, another way of implementing a lexical frequency IM 332 is identifying if characters belong to frequent lexical information units or not according to a lexical frequencies threshold 410 as illustrated in FIG. 4A. For example, in English very frequent, lexical information units include 'and', 'big', 'came', 'day', 'did', 'his', and 'on'. These lexical information units are especially frequent and because they are so commonly seen, are less informative than non-frequent lexical information units. A list of such frequent lexical information units is stored and used to look for matches in the text, or could be computed from the text corpus itself. When a frequent lexical information unit is identified in the text, each character within the lexical unit is assigned an information measure of less than 1.00, e.g., 0.90; non-frequent lexical information unit are assigned a default information measure of 1.00. In addition, identifying frequent lexical information units may be beneficial for controlling the informativeness of spaces and other punctuation before or after lexical units, especially for minimizing computational demands by treating all words below a certain frequency as equally non-frequent.

Figure 7G:
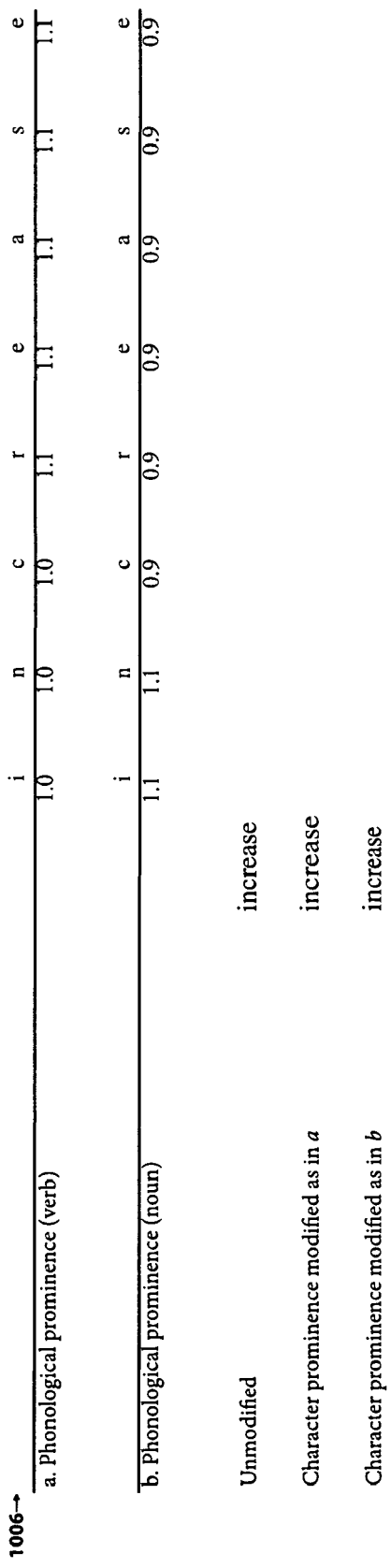

In another approach the lexical frequency IM 332, or sequences of lexical units can be calculated and mapped onto IMs with distinct functions 412. As shown in FIGS. 7A and 7B for English and Spanish examples, distinct functions 413 produce IM values 414 for each lexical unit that are used to compose text 415. The text can be composed using one dimension of physical prominence, for example horizontal scale as in 415, or using multiple dimensions, for example, horizontal scale and saturation as in 416. The frequency distribution of words is highly skewed along a $\log_2$ basis (Zipf). Thus the most frequent word is twice as frequent as the second most frequent word, which is twice as frequent as the third most frequent word, etc. Thus a transformation is useful if the IM is desired to be more linear (e.g., scaling frequency in $\log_2$ numbers, or taking the third root of the brute frequency in a large corpus, etc.).

In one embodiment of the invention, this IM can be scaled to local serial occurrences of lexical units that are repeated in a text, for example place or character names in a novel, or technical words in a textbook. Early occurrences of such lexical units differ in their informativeness from later occurrences in the text once the reader has become more familiar with the lexical unit. For example, in "The airplane went into a steep bank and then the airplane straightened out." the second occurrence of airplane is affected by the recent occurrence of the same word earlier in the sentence. Distance (in number of lexical units) between serial occurrences could be used to determine such local frequency.

Inter-Lexical Similarity IM

Figure 4B:
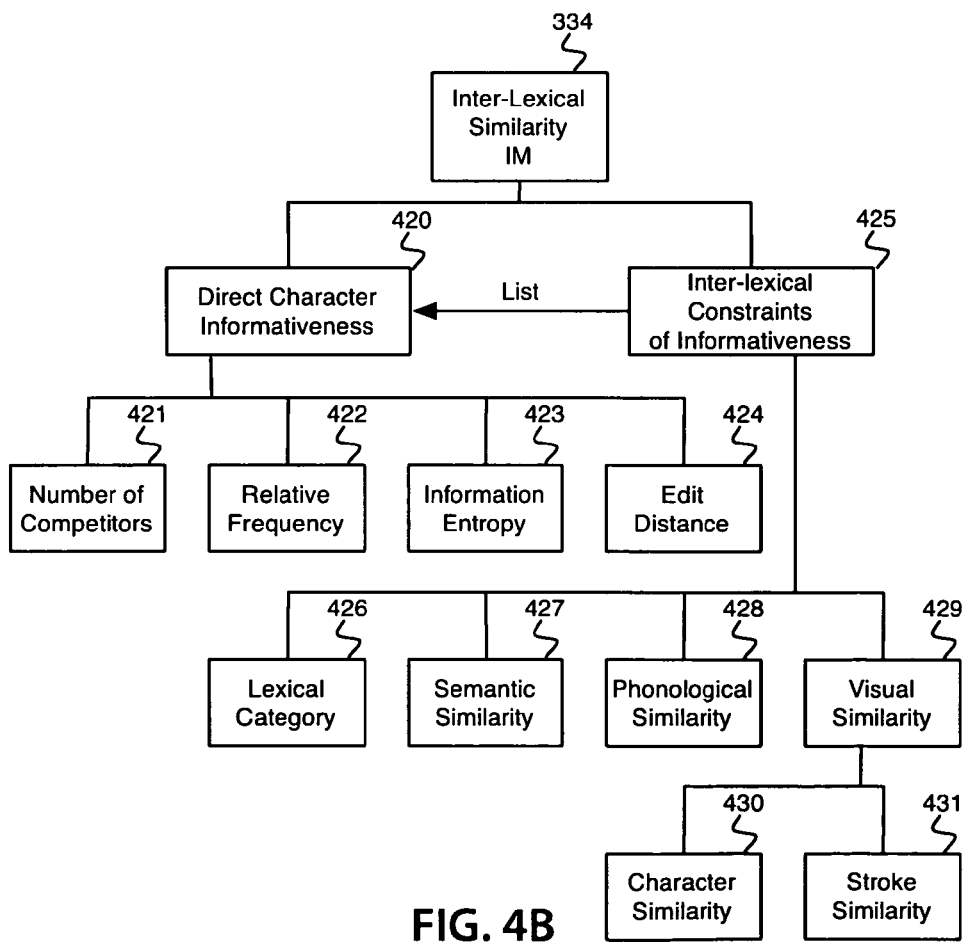

The inter-lexical similarity IM 334 identifies how lexical information units (e.g., words in English) are confused with other similar lexical units. For any given language, many lexical units are similar in character sequence to other lexical units—any particular word that is being perceived during the process of reading (i.e., the target lexical unit) must be distinguished from other similar possible competitor lexical units. As illustrated in FIG. 4B, this IM computes direct character informativeness 420—which characters differ (and which do not) for each lexical unit in a text for all similar lexical units that exist on a list of "competitor" lexical units. Initially the list may be just the words present in the corpus. The IM also computes inter-lexical constraints of informativeness 425—which modify or weight the likelihood that a lexical unit will be a competitor for a given target lexical unit and thus indirectly affect computation of this IM by modifying the list.

For direct character informativeness the lexical similarity of a given unit to other possible units could be calculated in a number of ways using one of a plurality of separate IMs or a combination thereof. Examples of the separate IMs are shown in FIG. 7C. One method is for each character in a lexical unit to compute the number of possible competitors 421 for that character in other existing words in the language that are present on the current list. For example, the first character (h) of the word head has five competitors in English, bead, dead, lead, mead, and read; the second character (e) has no competitors; the third character (a) has three competitors, heed, held, herd; and the fourth character (d) has four competitors, heal, heap, hear, and heat. In each case, the informativeness of the character is proportional to the number of competitor lexical units in the set it shares with the other characters in common: h=5, e=0, a=3, d=4. This can be directly converted into a letter distinguishing IM using 1−(1/n): h=0.80, e=0.00, a=0.66, d=0.75, where n is the number of competitors for each character position in a target word.

The effectiveness of such an IM can be improved by taking into account the relative frequency 422 of the target word against the frequencies of the words that compete for the target word in each character position. For the example given above, sample frequencies are given in parenthesis for the target head (402) and it competitors for: the first letter (h), bead, (8) dead (114), lead (58), mead (3), and read (284); the second character (e) has no competitors; the third character (a), heed (3), held (1), herd (10); and the fourth character (d), heal (8), heap (10), hear (1), and heat (55). Using the relative frequency of the target to each of its competitors for each letter:

$$\text{Informativeness}=1-\text{target}_{freq}/(\text{target}_{freq}+\text{sum}(\text{competitor}_{freq}))$$

This method gives frequency weighted informativeness values, in this example: h=0.54, e=0.00, a=0.03, d=0.16.

Another method is to interpret such probabilistic matrices into the information entropy 423 carried by each character. For this one can use Shannon's classic formula:

$$\text{Sum}(i=1 \text{ to } n)p(x_i)\log_2(1/p(x_i))$$

Using this formula, the information entropy for each letter in head is: h=0.75, e=0.00, a=0.15, d=0.39. One can also use various derivatives of the concept of entropy as a measure of relative informativeness of each character, for example scaling by the maximal possible entropy ($\log_2 26 = \sim 4.7$) to have a measure of the relative information entropy for each letter (in this example, dividing the information entropy for each letter by $\log_2 26$ generates: h=0.16, e=0.00, a=0.03, d=0.08). As is the case for all IMs, the mapping function onto functional informativeness to be used in modifying character prominence may be linear or non linear, depending on a number of factors.

The preceding methods assume that the only competitors of a lexical unit are other units of exactly the same length in characters. However, the informativeness of a target lexical unit can also be assessed in relation to other units with partial overlap with it. For example, head might compete with had, heard, header, etc. A quantitative measure of partial overlap uses string edit distance (e.g., Levenshtein distance) as a measure of relative information entropy 424. First the word is compared to all other words in the 'list' of words for that language and minimum edit distances between that word and all other words are stored in an array, fullDistance. The minimum edit distance is a measurement of the minimum number of insertion, deletion, or substitution operations needed to turn a character sequence into another character sequence. For example, transforming the sequence 'intention' into the sequence 'execution' requires one insertion (u), one deletion (i), and three substitutions (n→e, t→x, n→c); other sequences of operations could give the same result; however, this is the minimum number necessary for the transformation. If each insertion and deletion is assigned a value of one and each substitution a value of two, then the minimum edit distance in the example above would be computed at eight. These values for scoring the importance of insertions, deletions, and substitutions could be weighted differently, but the choices used in this example will be recognized as common choices for computing a minimum edit distance by those skilled in the art.

For a given lexical unit, characters are removed one by one and the resulting character strings are compared to the complete list of lexical units. For each substring, a separate edit distance value is computed and stored in a parallel array, partDistances. Comparison between the partDistances and fullDistances values is used to determine which characters for a given target string are critical (or not) for distinguishing it from other competitor strings. For example, if the edit distance between a target and a competitor string is four and if the minimum edit distance between the same target string with one character removed and a competitor string is three, then the information carried by the removed character helps distinguish that string from its competitor and that character should be emphasized. In contrast, if the edit distance with the character is four and without it is five, then removing that character has caused the words to be more like each other and that character should be deemphasized.

The usefulness of an inter-lexical similarity IM 334 can be improved by constraining or weighting the 'list' of competitors by factors that modify (increase or decrease) the likelihood that a competitor is relevant for a given target lexical unit 425. We describe examples of factors (lexical category, semantic similarity, phonological similarity, and visual similarity) 426-429 as shown in FIG. 4B. These factors are not IMs themselves, rather they improve (sharpen) the functionality of the inter-lexical similarity IM 334 by weighting the IM to reflect additional factors that affect how likely a lexical unit is a competitor for a target lexical unit.

Lexical Category.

In one implementation of using the lexical similarity between words to determine character prominence modifications, the lexical category 426 (e.g., noun, verb, etc.) can be used to constrain the list of competitors in the inter-lexical similarity IM 334 when determining direct character informativeness 420-424 to a given target. For example, the target word soap can be use as a noun or a verb, and hence soup will be a relevant competitor when soap is used as noun (but not as verb) and soar will be a relevant competitor when soap is used as verb (but not as a noun). In other more ambiguous cases, words such as soak, snap, and slap, which can occur as both nouns and verbs, could be relevant lexical competitors. When available, information about the lexical category of the target lexical unit can be used to compute different character prominence modifications for use in each kind of lexical category. These different character prominence modifications can thus help bias perception of the lexical unit in a way that facilitates perception of the correct lexical category of the unit and minimizes errors in syntactic processing of ambiguous lexical units. The lexical category of a target and its competitors could be looked up in a dictionary and for some words, the lexical category will be only one possibility. In cases of words that can be used in multiple lexical categories, an on-line parser could be used on the specific text to determine the lexical category for each usage in context. Once the ambiguous lexical category is disambiguated, the lexical similarity of that target word to competitors for that lexical unit. Another method for calculating lexical "category" is based on distributional properties in corpora, see below section on calculating lexical categories from distributional features.

Semantic Similarity.

Another basis for modifying the list of competitors and this IM is based on semantic similarity 427. For example, lexical units such as boggy, soggy, and foggy are semantic competitors with each other, but are not semantic competitors with the lexical competitor doggy. This information can be stored in a database of semantic relations (e.g., publicly available databases such as WordNet) or frequency of use.

Phonological Similarity.

Another basis for modifying the list of competitors is based on phonological similarity 428, because there is psychological evidence that when words are read they often automatically elicit pronunciation. For example, at a phonological level the vowels in head do not comprise the same context for the surrounding consonants as in e.g., bead, mead, but they do so with dead, and one of the pronunciations of read and lead. This can be used to further modify (reduce) the informativeness of the other characters in this case. Tear and dear, which differ from one another only in voicing, compete with each other more than either competes with hear, rear, or sear. Similarly, the initial sequence of two characters in then provides a context for the rest of the characters that competes more strongly with those in there than with those in thin. This information can be store in a database of phonological information, or this could be computed from rules of spelling.

In another implementation, for lexical units that have identical pronunciation but different spellings (e.g., but and butt in English) phonological similarity (accessed by available pronunciation dictionaries) can be used in conjunction with edit distance to identify characters which are lexically informative and differentiate homonyms from different parts of speech (e.g., a conjunction vs. a noun or verb).

Visual Similarity.

In another implementation of using the lexical similarity between words to determine character prominence modifications, identifying how easily characters are visually confused with other visually similar characters can be used to modify the list of competitors to a given target (visual similarity 429). For any given alphabet or character set, many lexical units are similar in visual structure to other characters—any specific character that is being perceived during the process of reading (i.e., target) must be distinguished from other similar possible characters (competitors). Thus, which characters are most likely to be visually confused (and which are not) for each character is a lexical unit in a text for all similar lexical units that exist in that language in general is critical.

The visual similarity of a target character and potential competitor characters can be determined empirically by measuring behavioral differences in how people discriminate characters (e.g., from "same" vs. "different" judgments). Alternatively visual similarity could be determined by measuring physical overlap between two characters in a particular typeface. In the case of logographic systems such as Chinese, similarity can be based on overlap of strokes between characters.

Characters in competing words can vary widely in their confusability or physical measures of confusability such as overlap between letters (character similarity 430). For example, the character c in the target word cars has relatively low visual similarity to the corresponding character, j, in the competitor word jars—about 41% overlap in the black area of the letters. Similarly, the target character l in the word less has relatively moderate visual similarity—about 78% overlap—to the character m in the competitor word mess. The character l in the target word lazy has relatively high visual similarity—maximal, 100% overlap—to the character h in the word hazy. This case points to the necessity of enhancing not just a character overall but of assessing the informativeness of a feature of the character that is maximally informative (stroke similarity 431). It is not helpful to enhance the vertical component of h in hazy, since that overlaps completely with l in lazy: rather the right hand portion of the h is what distinguishes it. Correspondingly what distinguishes the l, is the absence of a right hand feature, an absence which might be exaggerated by increasing the kerning between the l and what follows.

Modifying the prominence of characters in lexical units as a function of inter-lexical similarity 334 can be improved by taking into account the absolute or relative likelihood of visual confusability between a target lexical unit and its competitors via visual similarity 429. This can be using absolute or normalized (e.g., z-scores) measures of behavioral confusability or of physical overlap.

Extra-Lexical Information 312

Lexical Sequence IM

The Lexical sequence IM 322 computes the informativeness of extra-lexical characters such as punctuation at the boundary between lexical units. Punctuation in written language includes everything other than the characters used to write the lexical units themselves. For example, in English the characters used to write lexical units include the upper- and lower-case versions of the letters a, b, c, . . . x, y, z. Punctuation in English and other languages using the Roman alphabet can include punctuation marks between lexical units such as apostrophes, brackets, colons, commas, dashes, ellipses, exclamation marks, periods, guilemets, hyphens, quotation marks, semicolons, slashes; and also indicators of space such as: word spaces, indentation, and line, paragraph, column, page, and section endings.

Figure 4C:
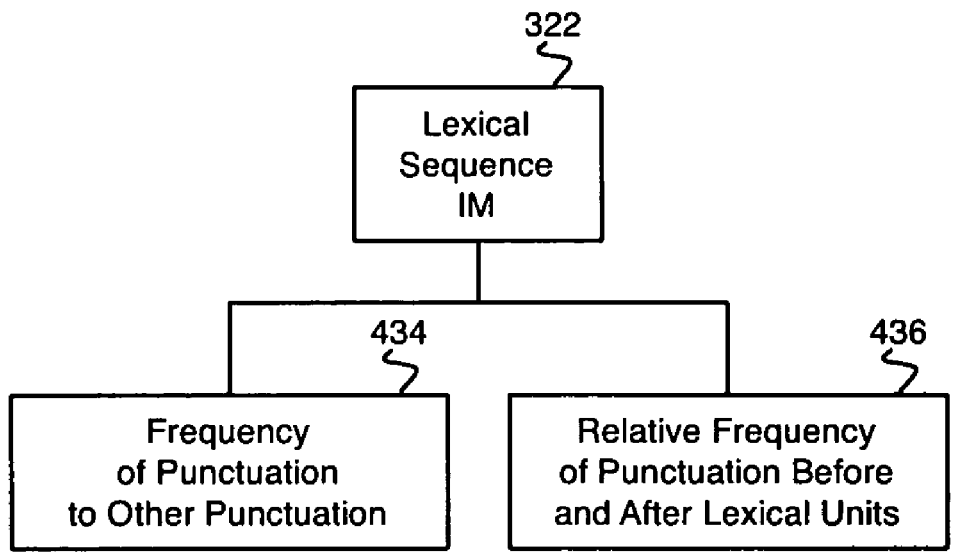

For example, the informativeness of word spaces and other punctuation can be determined as a function of their predictability compared with other punctuation marks 434 as illustrated in FIG. 4C. The informativeness of a space at the beginning or end of a lexical or extra-lexical unit is proportional to the frequency of the space out of all the other punctuation marks that begin or end respectively that lexical or extra-lexical unit, in a sample text. For example, the informativeness of the space at the end of the lexical unit "the" is relatively low because in texts the letter sequence "the" is almost never followed by a punctuation mark other than a space. The informativeness of the space at the beginning of the lexical unit "the" is relatively informative because "the" is frequently preceded by a punctuation mark other than space. This calculation is dependent on language-specific printing conventions for the use of punctuation marks in general. For example, in English punctuation marks immediately follow the letter sequence in a lexical unit, but precede the space at the beginning of a lexical unit. Thus, to calculate the informativeness of spaces before and after letter sequences, it is necessary to relate the space to the frequency of punctuation marks immediately following the lexical unit, or one character before the space at the beginning of the lexical unit.

FIG. 7D shows how the calculation of the informativeness of spaces on either side of a word 1000 can work in practice. One method to calculate it is first to examine in a large corpus the frequency with which a word is preceded or followed by word-bounding characters such as a punctuation mark other than a space, and by a space. The ratio of space to non-space word bounding characters is a measure of how informative it is that it is the space that bounds the word as opposed to some other character 434. This method can be generalized to provide an IM for each character that can separate lexical units, including the informativeness of a period, comma, dash, parenthesis, etc. FIG. 7D shows the calculation of the IM for spaces in a sequence of words, demonstrating that the IM for word bounding characters can be expressed as a mathematical combination of the IM for the character at the end of one word, and the IM for that same character as the bounding character for the beginning of the next lexical unit. The particular mathematical function to combine IMs is a user option. One method is to sum the IMs, another to multiply them, another to take the square root of the sum of the squares, etc. Which method is best will vary according to the desired linearity or nonlinearity of the resulting scale. FIG. 7D shows an example of computing the IMs for spaces in the sentence, The big elephant was breaking the small window in the garden.

Another method to calculate the informativeness of punctuation is to combine the predictability of punctuation after the lexical unit to the predictability of punctuation before the next lexical unit 436. An example of this method is also illustrated in FIG. 7D. This method can be applied to systems of punctuation that allow serial punctuation (for example a comma followed by a space) or nested punctuation (e.g., quoted text in brackets such as "parentheses"). This method can be applied to any language that uses a symbol system with word bounding characters or formatting locations. FIG. 7E shows such an implementation 1002 for Spanish, using the same method.

This method can be used to apply to word sequences as the unit bounded by characters. The advantage of this method can be that the informational value of a given n-word (two word, three word, etc.) sequence will be higher than that of a single word, and hence the informativeness value of the characters bounding (and within) the word sequence will be correspondingly more accurate.

Distributionally Determined Lexical Category IM

In normal language there are probabilistic constraints not just between individual lexical items, but also between the categories that those items instantiate. For example just as the is more likely to precede than follow elephant, so is the distributional category that includes the such as other words like and, some, etc. Hence the serial probability of a lexical unit can be expressed in terms of the likelihood of the serial predictability of that category given an adjacent category (Distributionally Determined Lexical Category IM—324).

Figure 4D:
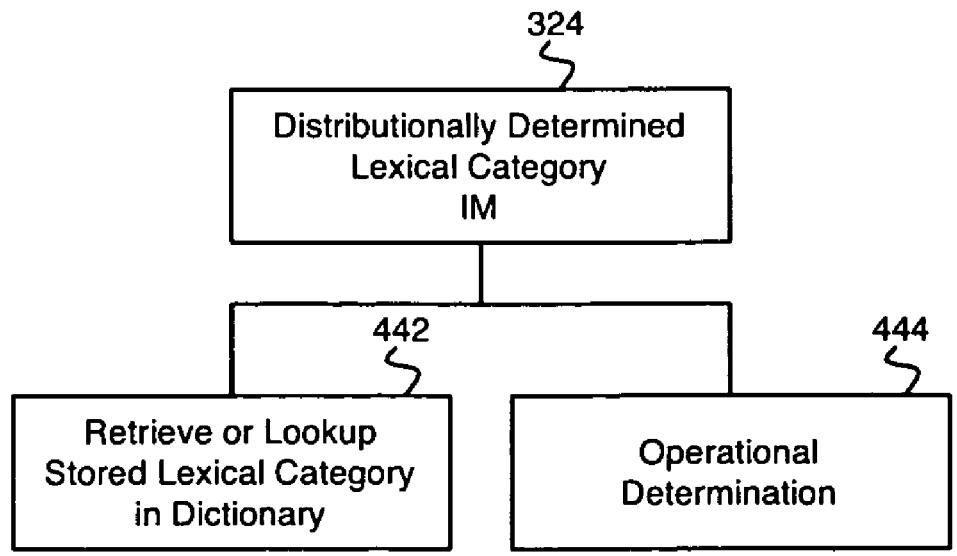

It is common practice to express lexical categories in terms of conventional labels such as "noun", "verb", "determiner" and so on. Thus one option for computing the IM of a categorization of a lexical unit is to analyze the frequency of patterns of sequences of units expressed in conventional notations. One method for determining this can be based on the frequency of specific sequences in a large corpus of text already marked in such conventional categories 442 as illustrated in FIG. 4D. The results of that analysis yields sequential pattern informativeness measures for sequences, e.g., of two words, three words, four words, etc. FIG. 7F shows an example of computing this IM 1004 for spaces in a short sentence, The big elephant was breaking the small window in the garden.

Another method for determining lexical unit categories is to compile statistical analysis of the contexts in which a word can appear. In this method each lexical unit is defined in terms of the set of lexical two other items that can precede and follow it at the same time. Lexical units can then be defined as falling in the same class insofar as their bounding contexts overlap. This method can be sharpened by the application of clustering techniques that provide hierarchical clustering analyses as a function of local environmental similarities of distribution. The resulting clusters can be expressed as categories, and the sequential category informativeness expressed in terms of them. This latter method has the advantage that it does not depend on actual prior linguistic categorization, but is based on operational discovery procedures that can apply to any language 444.

Sub-Lexical Informativeness 314

Character Sequences IM

Figure 4E:
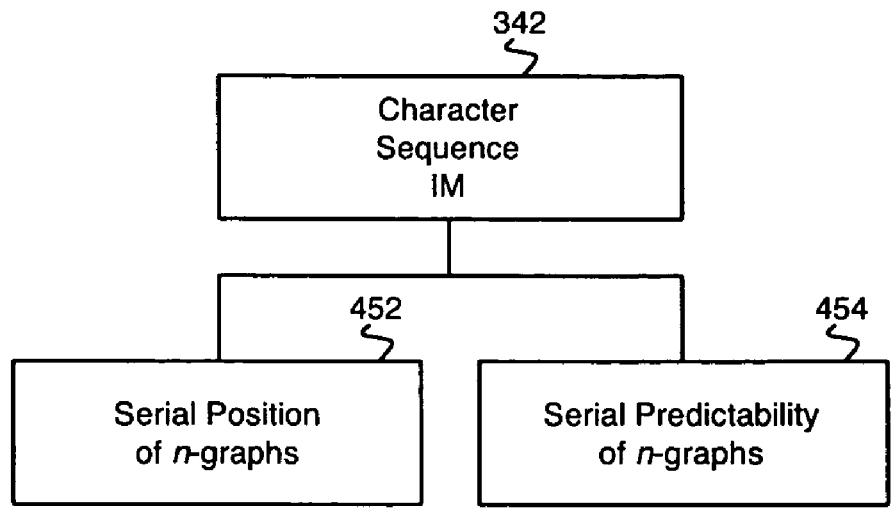

Serial Position. The character sequence IM 342 computes the informativeness of a character or n-gram (series of two, three, etc. characters) based on its serial position within a lexical unit 452 as illustrated in FIG. 4E. Because characters at the beginnings of lexical units are typically more informative than characters positioned medially within a lexical unit, this IM assigns higher informativeness values to earlier characters and lower informativeness values to later characters in a lexical unit. Each character in a word is assigned a serial position informativeness measure at $1.00-0.01\times n$ where n is the serial position of a character in the lexical unit beginning with 0. Thus, characters in a lexical unit would be assigned informativeness values of 1.00, 0.99, 0.98, 0.97, 0.96, etc. as their serial position increased from the start of the lexical unit.

In this example, this information measure uses a linear method and a scaling factor of 0.01 to compute serial informativeness; however, other scaling factors or polynomial, logarithmic, or exponential methods could be used as determiners of serial informativeness within a lexical unit for a particular language. For long words, a cutoff for the maximum scaling allowed can be implemented to prevent the characters at the end of the word from being adjusted in prominence beyond a user specified amount. Other interpretations of informativeness and serial position are available as alternatives. For example, from a behavioral point of view, short words may actually be most informative in their initial and final letters: s●●●k is more likely than ●hir● to be recognized as shirk. Thus, a "u-shaped" function can be assigned to implement the serial position IM. In ideographic languages such as Chinese, words are often made up of one or two characters only—in such cases, serial position may be ignored. Instead, in Chinese the conventional serial order in which individual strokes are written with a pen or brush can be the basis for adjusting by serial position.

Character Predictability.

In addition to the absolute serial position of a character within a lexical unit, there is another kind of information available in the sequence of characters: serial predictability 454. Spelling and other historical writing conventions constrain which characters are allowed to follow other characters (or which n-gram sequences can follow other n-gram sequences) and hence across a language characters (or bigrams, trigrams, etc.) vary in terms of their likelihood of following other characters (or n-grams) 454. The methods of computing lexical sequence IM 322 can be used to compute the informativeness of inter-character spacing (sometimes called kerning)

Modifying the prominence of the space between letters (kerning) is achieved by computing the probability of the $2^{nd}$ character following the $1^{st}$ character for each two-character sequence in a lexical unit, and also for each digraph (two character sequence) following a digraph, and so on for each n-graph following an n-graph in a lexical unit. For example, the informativeness of the spaces between the letters in the word fearful is a function of the probability of the sequences: _-f, f-e, e-a, a-r, r-f, f-u, u-l, and l-_; _f-ea, fe-ar, ea-rf, ar-fu, rf-ul, and fu-l_; _fe-arf, fea-rfu, ear-ful, and arf-ul_; and _fea-rful, and fear-ful_. This method is a natural technique for identifying the informativeness of inter-character spacing.

Sub-Lexical Frequency IM

Figure 4F:
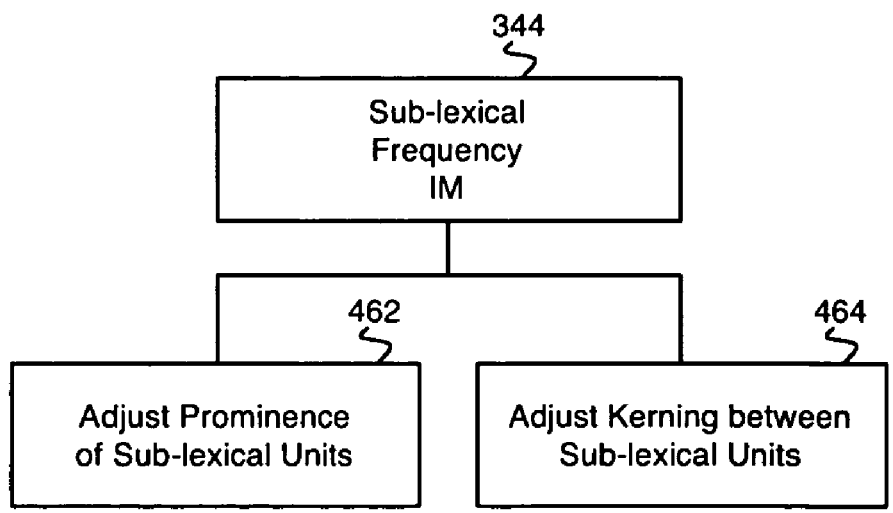

Sub-lexical frequency IM 344 computes informativeness based on the frequency of a sub-lexical unit (e.g., prefix or suffix) in a selected corpus. This IM identifies if characters belong to certain frequent sub-lexical information units or not. In a language such as English, such sub-lexical information units could include a list of very frequent sequence of characters which occur in multiple lexical units, such as "dis", "in", "im", "il", "ir", "ed" "ing", "ly", "s", and "es" and common, but less frequent sequences of characters which occur in multiple lexical units, for example, "inter", "pre", "able", or "ment". These sublexical sequences have features that vary in frequency and informativeness like lexical units, but are not lexical units themselves. A list of such frequent sub-lexical information units is stored and used to look for matches in the text. For languages such as English that typically have sub-lexical information units at the beginning (prefix) or ending (suffix) of lexical units, the sequences can be defined to include lexical boundaries such as spaces or other punctuation so that for example the suffix "ly" in "absolutely" is distinguished from other non-suffix occurrences of the sequence "ly" such as "lysine". Alternatively, sub-lexical information units could be identified and distinguished from high frequency lexical units by examining high frequency sequences and matching them with a dictionary of known lexical units. When a sub-lexical information unit is identified in the text, each character is assigned an IM of 1.05; the default for non-sub-lexical units is an IM of 1.0. As illustrated in FIG. 4F, this IM can be combined with other IMs to selectively modify character prominence of frequent sub-lexical sequences differently from infrequent sublexical sequences 462. However, this IM could be used by itself to selectively modify character prominence of frequent sublexical sequences by adjusting kerning (character spacing) between frequent and infrequent lexical sequences, for example after "mis" in "misinterpret" and before "less" in "fearless". Thus, this IM can be used to adjust character spacing (kerning) to increase the prominence of sub-lexical features (see 940 in FIG. 9B), for example, the legibility of "misinterpret" and "fearless" could be improved by increasing the kerning between the sub-lexical unit (e.g., prefix or suffix) and the rest of the lexical unit by 5% (IM of 1.05) 464.

In another implementation, once sub-lexical units have been identified within a lexical unit, the informativeness of the spacing (kerning) between the sub-lexical units can be controlled by computing the probability that the sub-units of the lexical unit begin or end a word.

Other languages mark entire semantic fields or phonological sequences with single characters or components of characters (Chinese). These can be used in ways similar to the use of frequent letter sequences in an alphabetic language such as English.

Phonological Prominence IM

Figure 4G:
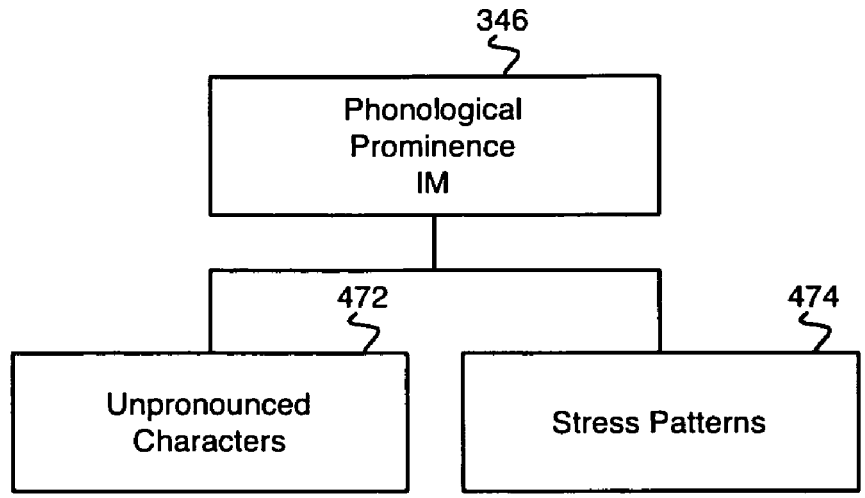

The phonological prominence IM 346 computes the informativeness of sequences of characters when the lexical unit is pronounced. Phonological properties of characters and character sequences bear on their psychological informativeness—that is, the fact that readers know how to pronounce a given lexical unit can play a role in the functional informativeness of each character. In some languages, stressed vowels are characteristic of particular words (e.g., English, Russian). This means that in the reader's experience the stressed vowel is more often clearly related to a particular symbol than the other unstressed vowels in the word. As illustrated in FIG. 4G, in one implementation, the user can modify the prominence of lexical units that contain unpronounced characters to be less prominent (e.g., the p in psychology, the mm in summer or e in made) 472. In another implementation, the information in the stress patterns 474 within a lexical unit can be used to modify character prominence. For example, the difference in stress when the word increase is used in verb or noun form can be used to modify character prominence 1006 as in FIG. 7G.

Orthographic Patterns IM

Figure 4I:
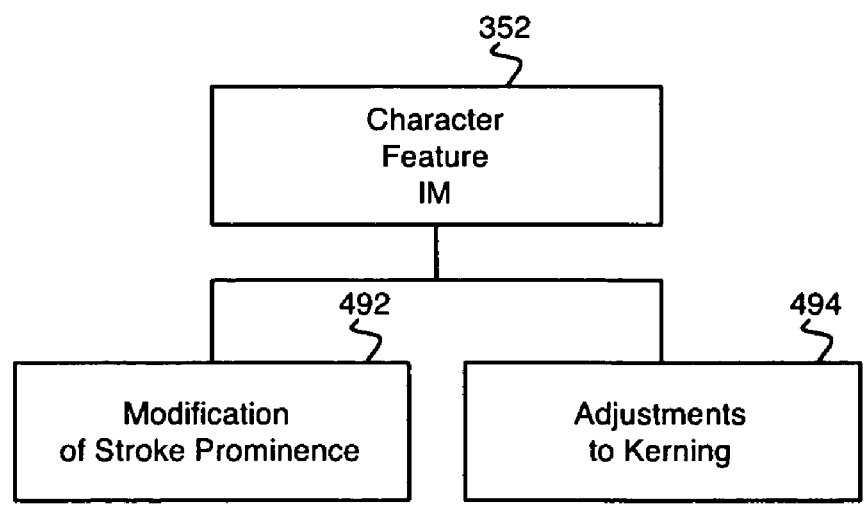
Figure 4H:
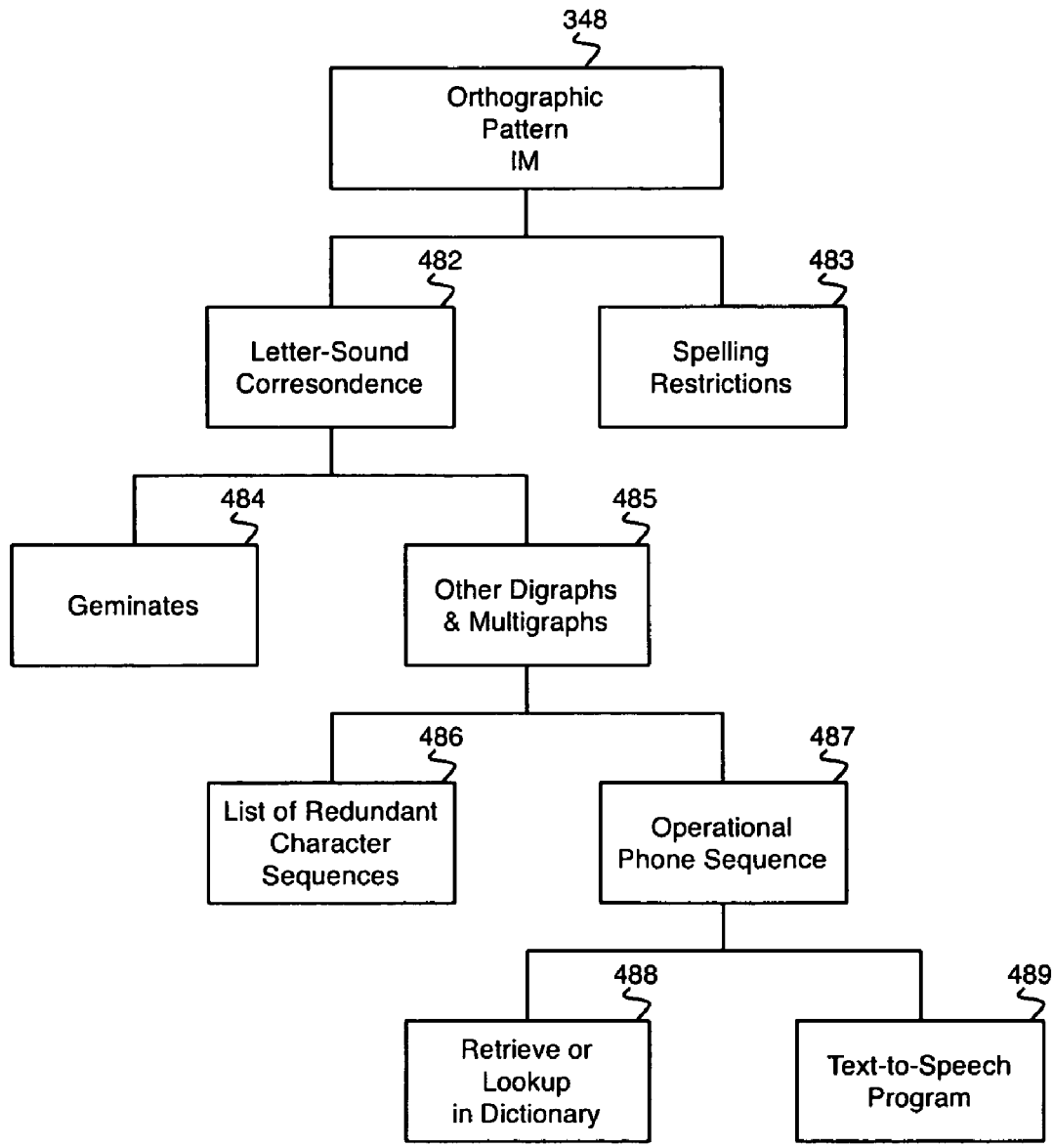
Figure 7H:
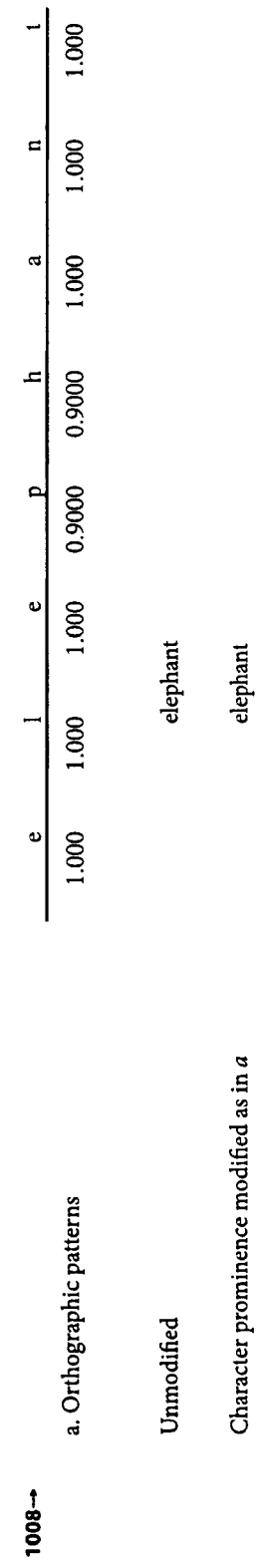

The orthographic pattern IM 348 computes informativeness of the character to sound correspondence in a lexical unit 1008 as illustrated in FIG. 4H. Orthography refers to the spelling conventions of languages with alphabetic writing systems, i.e., how characters correspond to sound in a writing system. In some languages such as English, multiple characters can correspond to one sound in some cases, whereas single characters can correspond to single sounds in other cases. Single characters representing a single sound carry more information per character than multiple characters that correspond to a single sound. A list of common multi-character sequences (digraphs, trigraphs, etc.) corresponding to single sounds for a given language is used to detect matches within the text (letter-sound correspondence 482). In a given language, particular phone or phoneme sequences are permissible, while others are not. These restrictions on sequences of sounds are reflected in the character sequences used to represent those sounds. For example, 'ft' is not a valid initial sound (or character) sequence in English. Using spelling restrictions, patterns of spelling that are irregular can be made more prominent than regular spellings (spelling restrictions 483). For example in English, such common orthographically redundant character sequences includes geminates (doubled characters) such as 'dd', 'll', or 'mm' 484, other digraphs such as 'ch', 'qu', 'ph', 'sh', or other letter sequences in which multiple characters correspond to a single sound 485. Once an orthographically redundant character sequence has been identified by matching the list 486, the matching sequence is assigned an information measure of 0.90, while non-matching sequences are assigned an information measure of 1.0, as illustrated in FIG. 7H.

This embodiment of determining orthographic informativeness is preferred when other operational methods of determining phone sequence 487 such as retrieval or lookup in a dictionary 488 or out of a text-to-speech program 489 are not available. However, one skilled in the art will recognize that many text editing or layout programs use built-in dictionaries that list pronunciation information 488 that could be used in addition to a list of orthographically redundant character sequences to correctly assign infrequent orthographically redundant character sequences, or avoid an incorrect assignment such as the sequence 'sh' in the word 'customshouse,' in which the 'sh' sequence is present, but 's' and 'h' correspond to separate sounds. In other systems (e.g., Chinese) components of characters such as semantic or phonetic radicals, can indicate an entire semantic field, or syllable: the informativeness of the phonological radical is then assessed as a function of the probability of other items with the same semantic field radical, and conversely.

Sub-Character Informativeness 315

Character Feature IM

Characters used in writing systems are constructed from various features or components. For example for letters such as used in the Roman alphabet, strokes used to generate the letterform can form stems, bowls, serifs, crossbars, cross strokes and ascenders and descenders. A character feature IM 352 computes the informativeness of these features and adjusts the prominence of these features either by directly modifying the prominence of the stroke (e.g., stroke width) or counter (white space) bounded by the stroke 492, or indirectly by adjusting the kerning 494 to make the feature more pronounced (e.g., increasing the spacing between the sequence 'rn' to maximize perception of 'r+n' and minimize perception of 'm' as illustrated in FIG. 4I.

Computation of IMs

Many of the information measures determine character informativeness for lexical information units (e.g., words), so a first step is to run a tokenizer (step 224 in FIG. 2B) to determine when lexical units begin and end. Because the tokenizer can be used for several of the IMs, it can be run once and its output used for different IMs. The results of this operation include a list of lexical units and the starting and ending positions of each lexical unit in the character array. In languages with spaces and other punctuation characters between lexical units or other subsequences, tokens can be isolated as sequences surrounded by punctuation characters, examining normal corpora; another method is to access on-line dictionaries; finally, one can use analyses provided by such sciences as linguistics, acoustics, or literary theory and discourse analysis. In languages that do not use special marks around lexical units or even sentences, the latter two methods may be used.

FIG. 3B illustrates an embodiment for computing the multi-level representations of IMs outlined in FIG. 3A. This embodiment can be summarized as four different iterative processes occurring in parallel on a lexical unit sequence: computation of extra-lexical 312, lexical 313, sub-lexical 314, and sub-character 315 informativeness. Note, the calculation of any of the informativeness measures 312-315 or any of their component IMs may be disabled for a given application. The desired combination may be user-selected, based on the application, based on the text input itself and/or on processing resources.

As shown in FIGS. 3A and 3B a lexical unit sequence 360 is examined (step 361) to determine if the process has reached the end of a sequence or not (step 362). If it is not the end of a sequence, the lexical frequency IM 332 is computed (step 364) for the current lexical unit. Next the inter-lexical similarity IM 334 is computed (step 365) on the same lexical unit. These steps 364 and 365 are repeated for the next lexical unit in the lexical unit sequence 360 until there are no more lexical units to process at which point the process ends (step 366). For each lexical unit the lexical frequency and inter-lexical similarity IMs are provided as the lexical informativeness 313 (step 367). In parallel, the lexical sequence IM 322 is computed (step 368) followed by the distributionally determined lexical category IM 324 for each lexical unit (step 369), advancing to the next lexical unit (step 370) and repeating until there are no more lexical units to process. For each lexical unit the lexical sequence and distributionally determined lexical category IMs are provided as the extra-lexical informativeness 312 (step 371) Also in parallel, for each lexical unit, the character sequence within that unit is examined (step 372) to determine if it is the end of the character sequence (step 373). If not, then the four sub-lexical IMs are computed in series: character sequence IM 342 (step 374), sub-lexical frequency IM 344 (step 375), phonological prominence IM 346 (step 376), and the orthographic patterns IM 348 (step 377). These steps are repeated until the end of the character sequence (lexical unit) is reached and the four IMs are provided as the sub-lexical informativeness 314 (step 378). Finally, for each character, the character feature IM 352 is computed (step 379) and provided as the sub-character informativeness 315 (step 380). A CIM 310 is computed (step 381) for every character as a function of the extra-lexical, lexical, sub-lexical and sub-character informativeness.

Integration of IMs to Form CIM

Figures 5, 6A:
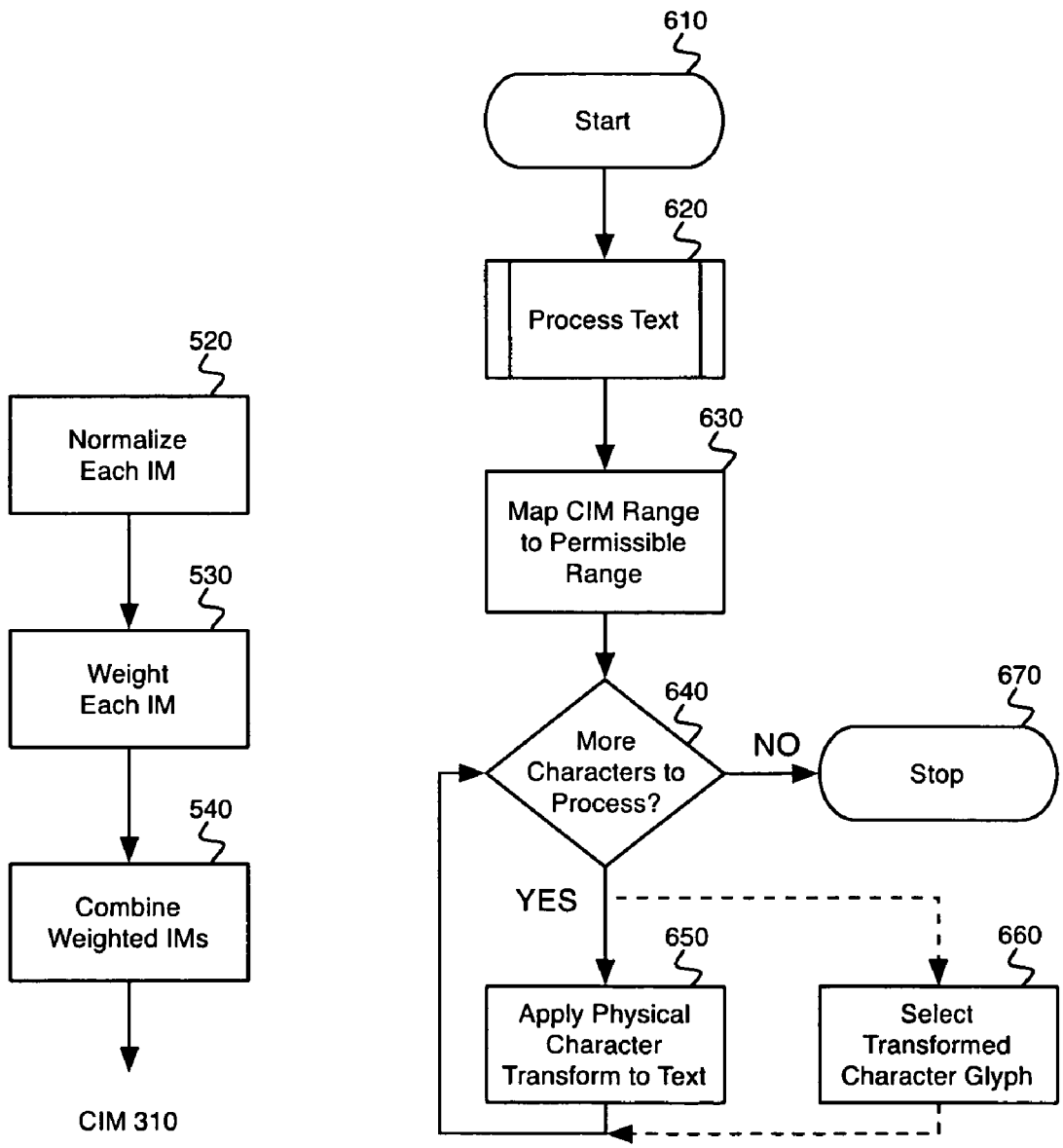
FIG. 5 is a flow chart of the steps of an embodiment for integrating the IMs to form a CIM.
FIGS. 6A, 6B, and 6C are flowcharts of general purpose, semi-automatic, and automated embodiments of a rules-based method for modifying the visual prominence of characters or features as a function of the combined information measure.

Each IM represents the result of an analysis of the informativeness of a character feature, character, lexical unit or lexical unit sequence on a range of dimensions. An IM is computed for each character in a language unit indicating the predictability of a character to differentiate the language unit from other language units. Although the CIM may be comprised of only a single IM, the predictive capability of a character is typically enhanced by combining multiple IMs. An embodiment for combining IMs is illustrated in FIG. 5. Because each separate IM may have its own range and distribution (linear, nonlinear, geometric, Gaussian, etc.), the first step of computing a CIM is to normalize each IM (step 520) so that the IMs have the same numerical range, for example from 0 to 1. Next each IM is assigned a weight relative to its importance (step 530). These weights may, for example be user-specified or based on a statistical analysis of the effectiveness of different weightings applied to text. The weighted IMs are combined (step 540) using any of the computational methods such as the following: addition, multiplication, root mean square (RMS), logarithmically, or any other many-to-one mapping—producing a combined information measure (CIM) 310 specified for each character feature, character, sub-lexical unit, lexical unit, unit sequence, etc.

The method of computing a CIM is unique in being applicable to any alphabetic/symbolic system which differentiates sounds or words by means of visually arranged features, or characters. Thus, the methods described below can be applied automatically to many languages with conventional writing systems. That is, the procedures for analyzing and determining the CIM for each feature or character, apply without linguistic, mathematical, or psychological analyses imposed by the knowledge of the user. Rather, the user need only specify the input and choose a text or texts for the program to analyze automatically and assign a CIM to each feature or character. The program can also be adapted to subsets within a language, for application to special vocabularies or kinds of writing (e.g., normal, scientific, legal, medical, etc.). It can also be applied to the writings of a single author if there is sufficient text for analysis.

Composing Text Based on CIM

The CIM represents a mathematical description of the information content of a specific character or character feature. An adjustment to a physical feature is determined for each character or a subset of characters in the text input to modify the visual prominence of that character according to the respective CIM values to improve readability, legibility and/or print economy subject to the constraint of preserving the format of the text input. A subset of characters may constitute only between word spaces, only letters, all characters on a specific line, a subset of all language units, etc. The language units may be defined so that CIM values are only computed for the subset of characters to be adjusted or values may be computed for all characters in the text input. These adjustments are then applied to each character to compose the text input.

Figure 9A:
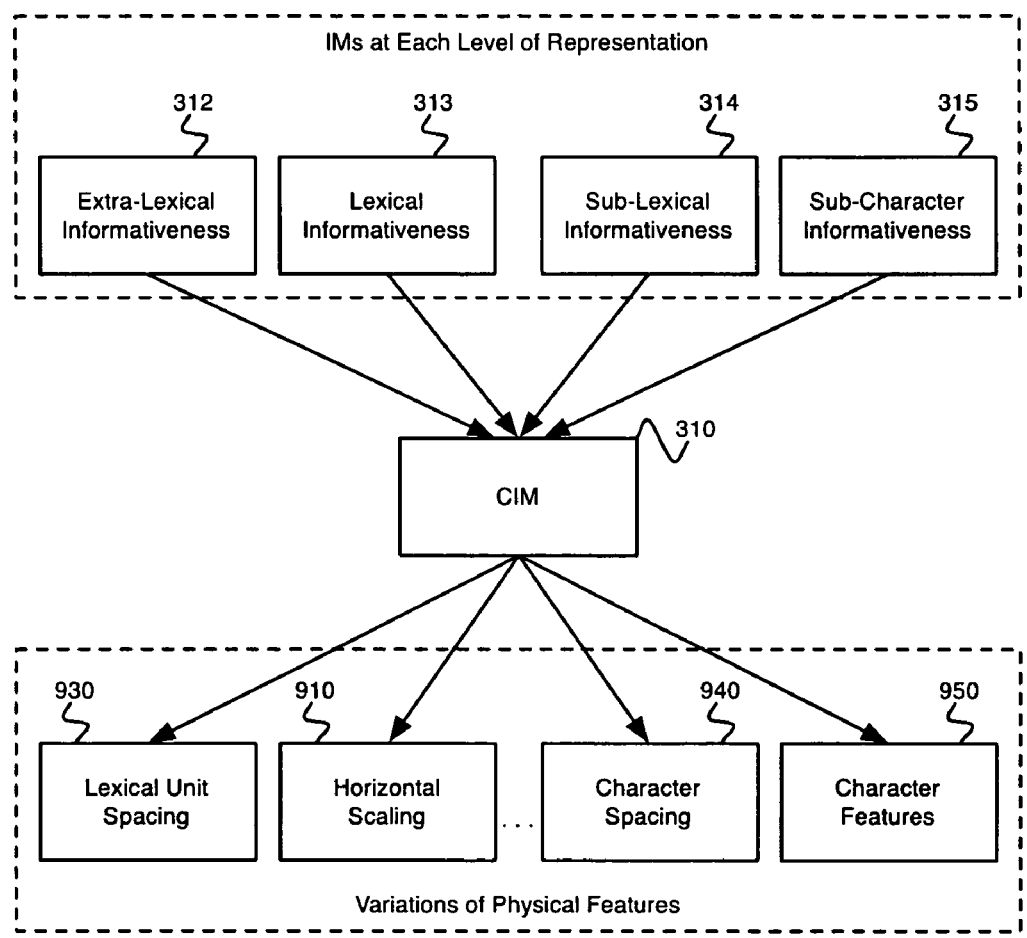

FIGS. 9A and 9B demonstrates how the CIM 310, formed as a combination of one or more IMs 312, 313, 314 and 315, can be translated into a physical parameter space of the character or character feature such as by horizontal 910 or vertical 912 character scaling, saturation 914, typeface weight 916, stroke thickness 918, slant 920, lexical unit spacing 930, character spacing (kerning) 940, character feature length, character feature curvature, character feature angle, character feature thickness, brightness or other physical features using a mapping function. The mapping functions from the CIM value to the scaling percentage could be linear as is shown in FIG. 9B, but could also be a quantal, Gaussian, or any other function that can map the CIM range to the corresponding physical range. These translations into physical parameter space can be achieved by using built-in adjustments within the composition program (step 650 FIG. 6b) such as is used in all of the examples in FIG. 9B except for typeface weight 916, or by glyph substitution (step 660 FIG. 6B) when it is available for the dimension being transformed. For example, the typeface Univers has been designed with alternative weights 916, thus selecting the glyph of the appropriate weight can achieve better results in the appearance of ratio of the stroke (black) to the counters (white space) in a font designed with variable weights compared to composition programs that allow the user to artificially alter the stroke width such as stroke thickness 918. Gylph substitution could also be used for other parameters such as horizontal or vertical scaling, saturation, or slant if a font were designed to be variable in these dimensions.

Figure 13:
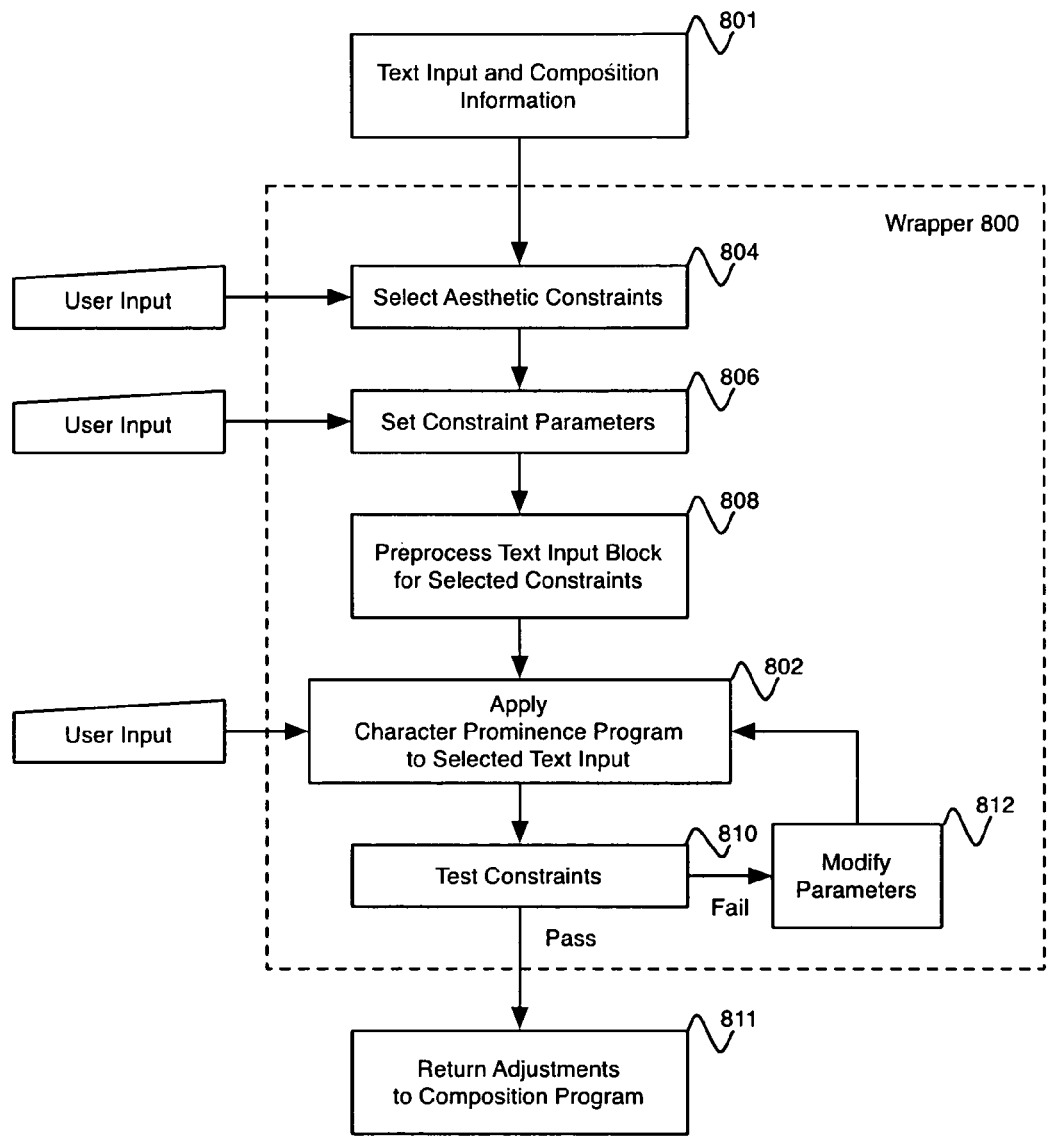
FIG. 13 is a block diagram of a plug-in including the core character prominence program and a wrapper for ensuring compliance with user selected aesthetic constraints.

As illustrated in FIG. 13, the character prominence modification program 212 shown in FIGS. 2A and 2B will typically include a wrapper 800 that allows a user to select aesthetic constraints and then controls the application of the core character prominence program to improve readability and/or legibility to both preserve the input format and comply with the aesthetic constraints. The text input and composition information (e.g., format and a list of uniform values for physical feature(s)) are provided from the composition program (step 801). A user may select one or more aesthetic constraints (step 804) using, for example, a pull-down menu. Typically, constraints might include "text block length", "line variation", "line ending hyphenation", etc. The user may then enter the appropriate constraint parameters (step 806) for any selected constraints. For example, for "text block length", the user might specify "no change", "10% decrease" or a "fixed size". Depending upon the constraint, the wrapper may then pre-process the text input block (step 808) to gather information needed to apply the core character prominence program (step 802). For example, the wrapper might pre-process the text input to determine the initial length, line variation or frequency of line ending hyphenation. The wrapper may then either incorporate the constraint parameters and pre-processed information directly into the character prominence program or prompt the user with the relevant information. For example, the wrapper could automatically set the permissible range of variation for the physical features based on this information or, when the user pulls up the menu to specify the range, display the information to the user. Once the core prominence program is applied to the text input (step 802), either the entire block or a portion thereof depending on the wrapper and possibly the iteration, the wrapper processes the text input with the adjusted values for the physical features and tests the selected aesthetic constraints (step 810). If the text input passes, the adjustments are returned to the composition program (step 811) or to the main program if a stand-alone. If not, then either the wrapper modifies parameters of the character modification program or prompts the user to do so (step 812) and the core program is reapplied (step 802) and the constraints retested (step 810). Depending on the approach used to map CIM values to physical adjustments, the 'modifications' may be made to the user-specified parameter ranges and/or to how the available space is distributed, e.g., to reduce the appearance of rivers or balance modifications on different dimensions perhaps with the effect of fixing loose/tight lines. The CIM values need not be recomputed. The wrapper may be configured to only iterate a limited number of times, perhaps only once, whether the constraints or met or not. It is possible that the user selected constraints and parameters cannot be satisfied for a certain text input or that the constraints can only be satisfied by unduly sacrificing readability, legibility or length. The wrapper may be configured to notify the user of any unmet constraints.

The character prominence modification program can be implemented as either a semi-automatic program or an automatic program. In either case the user selects desired aesthetic constraints, if any. The degree of automation refers to whether the user is involved in the application of the core modification program and whether the constraints are satisfied. Embodiments of general purpose, a semi-automatic, and automatic programs in which the user has specified a 'target length' as aesthetic constraint are illustrated in FIGS. 6A, 6B, and 6C, respectively.

A general purpose embodiment of a rules-based method for modifying the visual prominence of characters as a function of the combined information measure is illustrated in FIG. 6A. After selecting a text block, the user starts (step 610) the processing of a block of text (step 620) as described previously in FIG. 3B. Once each character in each language unit is assigned a CIM 310 as described in FIG. 5, the CIM range is mapped onto a permissible range (step 630). At this point each character in the text block is processed (step 640) by either applying a physical character transform (step 650) or a glyph substitution (step 660) defined by this mapping to each character's CIM in the language unit to alter the physical feature (e.g., character width) (step 270 in FIG. 2B). As mentioned previously, the mapping described in step 630 can be defined either by a specified physical range, e.g., a default range, user-specified, or specified by the program from a priori knowledge. The specified physical range mapping gives precisely the amount of specified variation in the adjustment that can be made to the physical feature and can be used to simultaneously effectuate changes in the overall length of a text block while modifying the visual prominence of individual characters. In the specific case in which the overall length is to be maintained, the excess line space or available space can be used to automatically constrain the adjustments so that the length is not altered. In general this is done with a mapping function F (CIM, available space, nchars, current extent). A simple formula to distribute the available space proportionally to each character's CIM is F(*)=CIM*(available space/nchars)+current extent/nchars. For example, characters with CIMs below the first quartile may be modified proportional to their CIMs such that the total extent of characters below the first quartile is decreased by ⅙ of the excess space, those below the second quartile modified proportionally to their CIMs such that the total extent of characters remains the same, similarly for the third and fourth quartiles, expanding by ½ and ⅔ the excess space respectively. This produces a large range of physical adjustments with emphasis shifted towards more informative elements. The two approaches may be combined by picking the mapping transform which either fills the available space in the block or meets the parameters if the parameters constrain the amount of variation such that the resulting overall increase in physical prominence is less than the amount of available space. This has the effect of preserving length and producing at most as much variation as the user permits. This process is repeated across all characters in the text block until the process has been applied to all of the characters and composition using the CIM is completed (step 670).

Figure 6B:
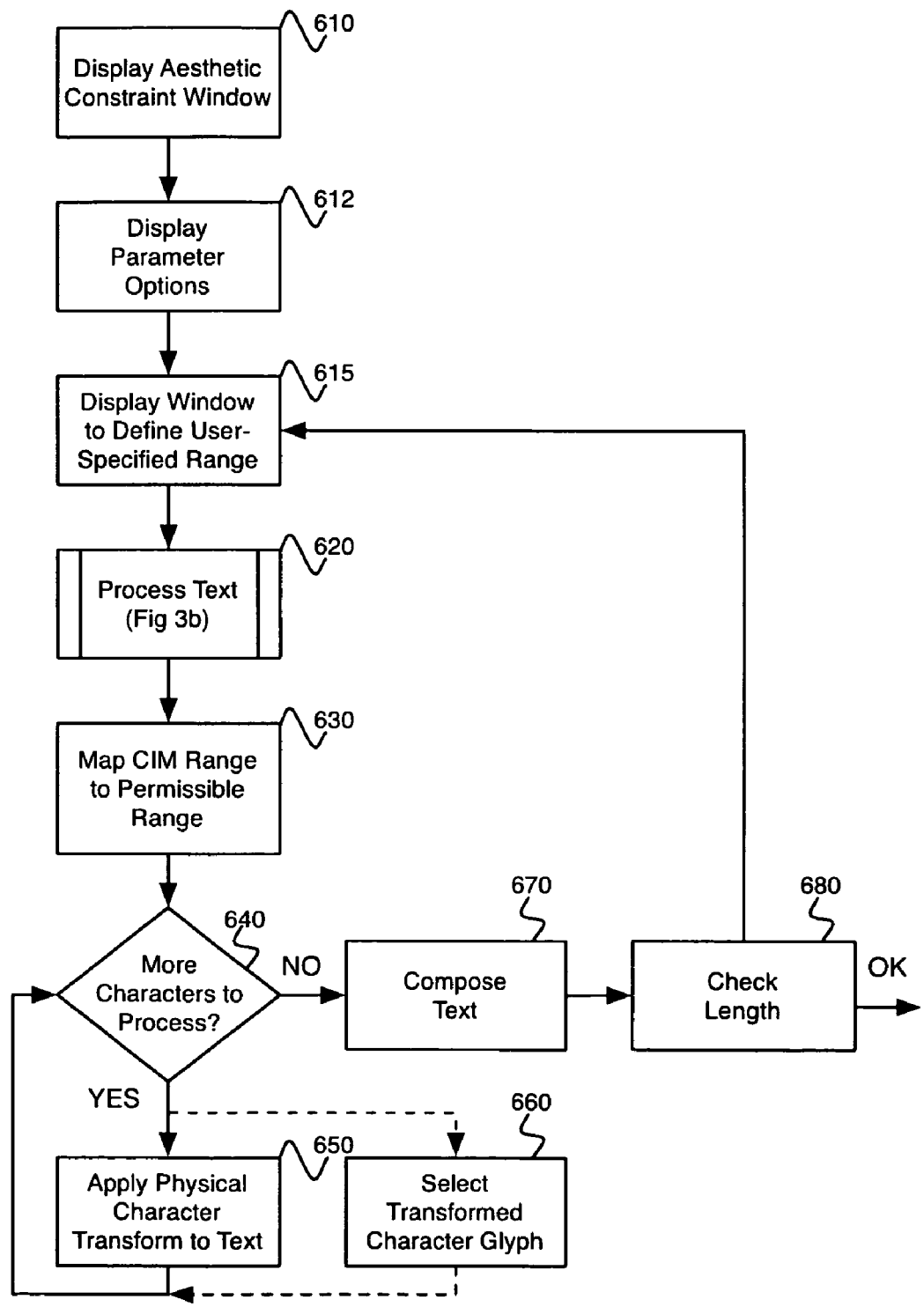
Figure 6C:
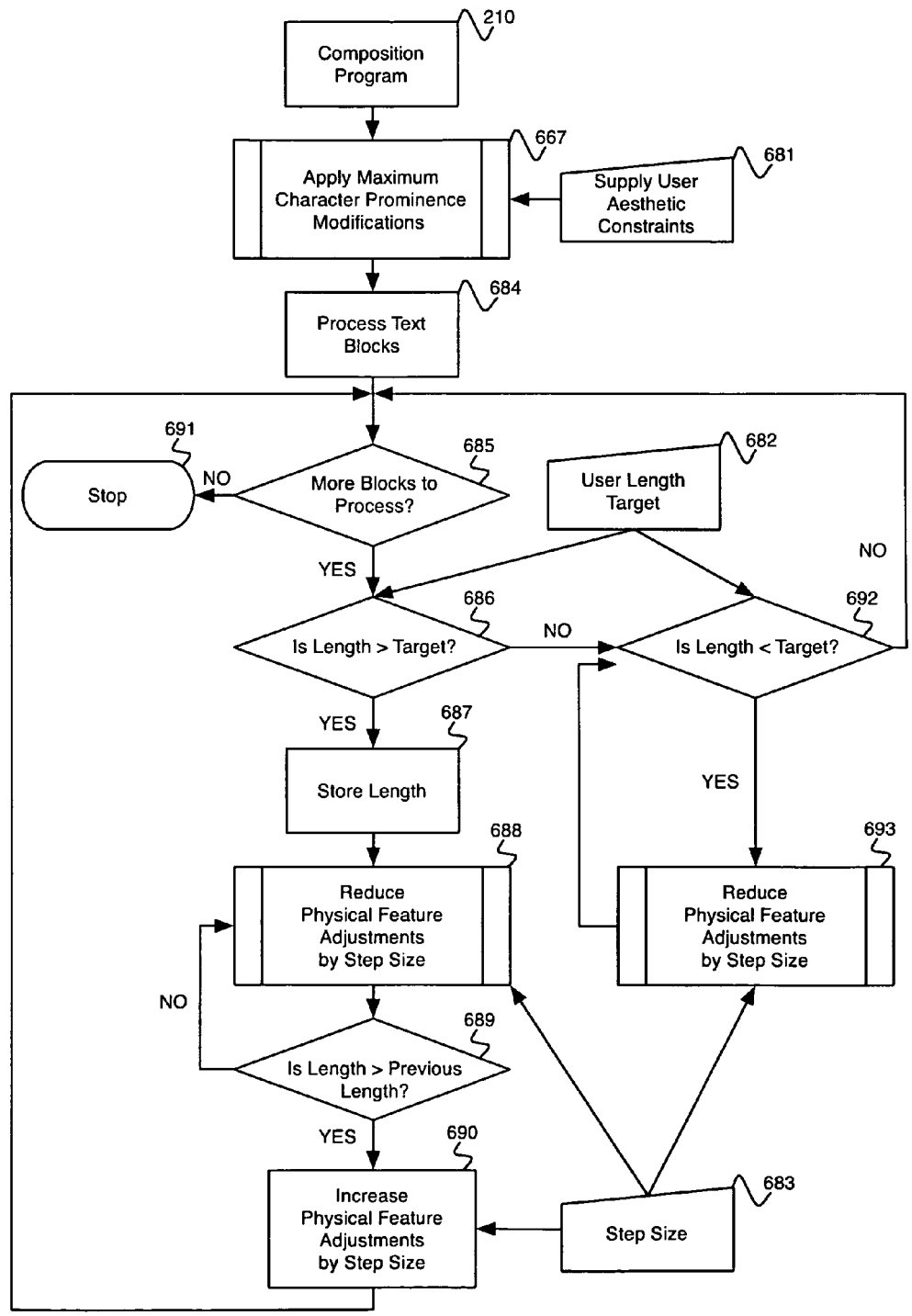
Figure 10:
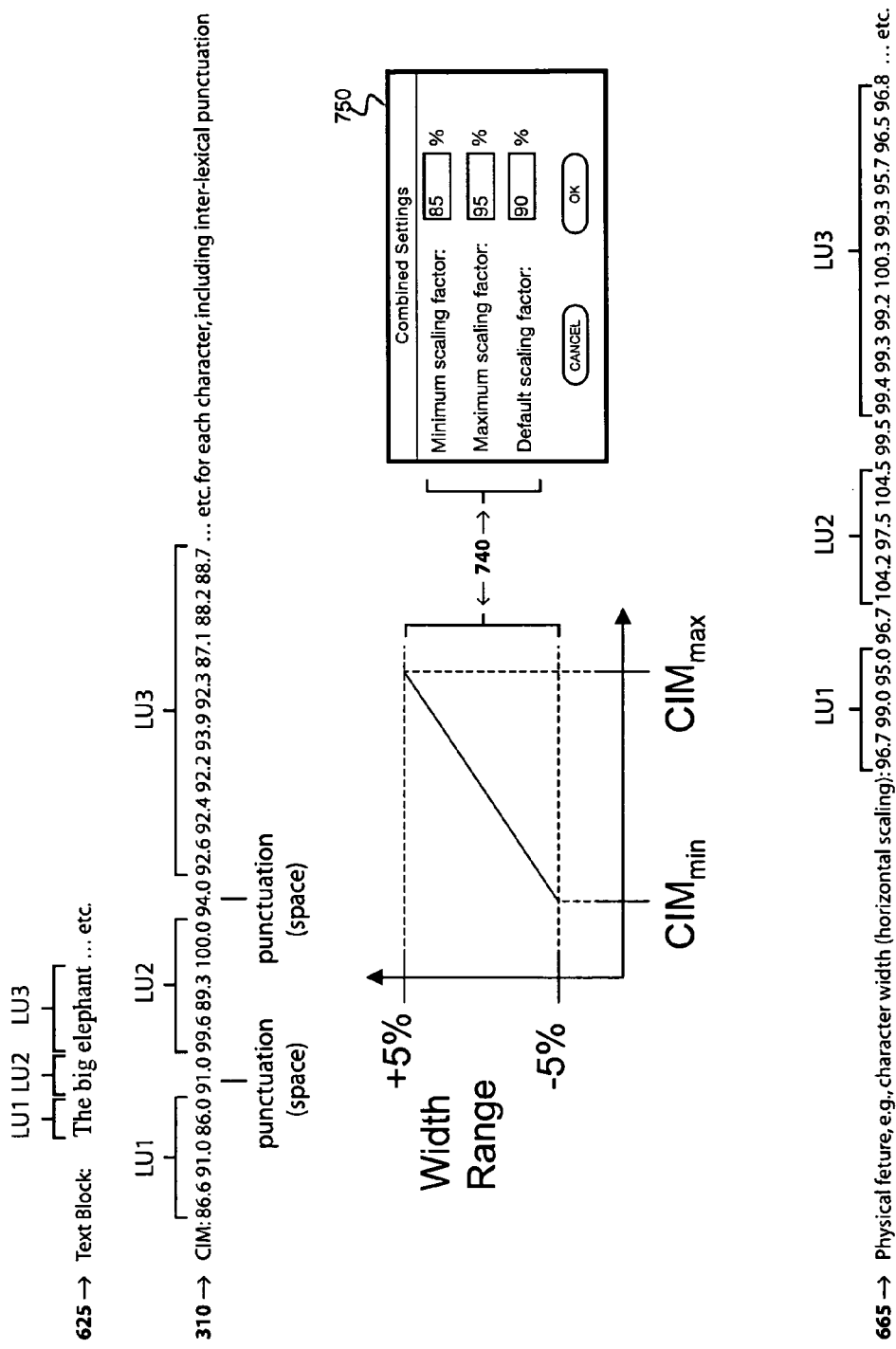
FIG. 10 is a diagram of the language units of text input, a CIM for each character, an application interface for user specification of a range of physical adjustment values, the transformation of the CIM into the user-specified range, and the adjustments to the physical features of the characters.

A semi-automatic embodiments of a rules-based method for modifying the visual prominence of characters as a function of the combined information measure is illustrated in FIGS. 6B and 10. In this example, only horizontal scaling is being performed to adjust the width of each character subject to the aesthetic constraint of a 'target length'. Prior to initiating text processing, the user requests and the plug-in displays a window (step 610) that allows the user to select aesthetic constraints, in this case "set target length". The plug-in then displays options for setting parameters e.g., "set target length" (step 612), in this case the user specifies "reduce 10%". The plug-in displays a window 750 that prompts the user to enter minimum, maximum and default scaling factors to define a user-specified range 740 (step 615). In this example, the user has specified a default scale factor of 90% with a plus and minus 5% range. This should reduce the overall length of the text input by approximately 10% and allow the widths of individual characters to adjust +/−5% to improve readability while preserving the input format. The user could have specified a different acceptable variance, larger or smaller, if desired.

The text is processed (step 620) (as described in FIG. 3B) to separate the input text block 625 into language units LU1, LU2, etc. and assign each character in each lexical unit a CIM (as described in FIG. 5). The CIM range is mapped (step 630) to a permissible range, e.g., the user-specified range 740 in this example, until there are no more characters to process (step 640). At this point, either a physical character transform (step 650) or a glyph substitution (step 660) defined by this mapping is applied to each character's CIM in the language unit to alter the physical feature (e.g., character width) 665. For example, a character having the minimum CIM will map to a 85% physical feature and a character having the maximum CIM will map to a 95% physical feature. This adjustment is then used to scale the original value of the physical feature. In the plug-in version, the list of adjusted physical features (numbers) is returned to the text editor/layout program to compose the text 675 based in part on the physical features (step 670). For example, the text editor/layout program may provide the input text block in which the list of physical features are all 100.00 (default 100%) and the plug-in will return a list of physical features that range from 85.0 to 95.0 and adjust from character-to-character based on each character's CIM. The values for physical features for characters that are not part of the defined language unit or not part of the processed language units are unaltered. In many applications, the language unit is defined as a lexical unit and all language units are processes whereby all values are subject to adjustment. In other applications, the language unit may be, for example, defined as only the between word spaces in which case only the values for between word spaces are subject to adjustment.

In this semi-automated embodiment, the resulting physical output when complete may result in a text length that does not achieve desired target length albeit reducing, maintaining or increasing the length (check length step 680), in which case, the user can enter a different range (step 615) and repeat the process until a target length is achieved. Similarly the user could "check readability" or "check legibility" at step 680 and adjust the +/−% range and repeat. This embodiment has the advantage of being an interactive tool that when combined with human judgment could be used to solve common typesetting problems, for example to eliminate single, incomplete lines at the end of a paragraph that sometimes can occur at the beginning or end of a page (often called widows or orphans) and are considered aesthetically undesirable.

By default, the embodiment will use the same range and mapping function for each character or character feature. The user can optionally define a different range and function for each physical feature as it applies to each character, character feature or defined group of characters or character features. For example, the user-defined range for the width of a narrow character such as /l/ might be less than that for a wide character such as /m/. Punctuation marks that separate words, including word spaces, can be mapped onto adjustments in any physical feature that separates words. This can include adjusting the size of between-word spaces on a line, but it also includes other composing options that adjust the distance between two adjacent words in a text, such as joining the two words into one, or separating the two words with a line break or a space size large enough to result in a line break.

In an automated embodiment shown in FIG. 6C, user-specified aesthetic constraints are supplied (step 681) including a length target 682 and a step size 683 define the strength of the physical prominence adjustments for each iteration. The iterations are further limited by an overall range of allowable physical variation. Character prominence modifications are applied (step 677) to text selected in the host composition program 210 using the character prominence modification program 212 described in FIG. 2B, producing maximum adjustments to the physical feature(s), hence maximum prominence modifications permitted by the user aesthetic controls (i.e. the CIM will initially be mapped to the full extent of the overall range governing the iterations).

The resulting text is then broken into blocks (step 684) with each block including at least one and typically many language units to be iterated over (step 685). On each pass, the length of the selected text is compared to the target length. If the selection is longer than the target length (step 686), the current text length is stored (step 687) and the adjustments to the physical features iteratively reduced by one step size (step 688) until the resulting length is longer than the previously stored length (step 689). At this point, the adjustments to the physical features are increased by one step size (step 690), producing a text length as close as possible to the user-specified target length 682 and ending the process (step 691).

If the selection is shorter than the target length (step 692), adjustments to the physical features are reduced by one step size (step 693) to maximize the preservation of the original formatting without increasing length beyond the user-specified target length. Step 693 is repeated until the length is not less than the target ending the process (step 691).

Text Composition

Although the described approach to make character prominence modifications to "maximize goodness" generally improves legibility, readability and/or print economy while preserving the input format and satisfying (or attempting to satisfy) any user defined aesthetic constraints there are a number of specific cases that are of particular importance. The cases will be illustrated as applied to unformatted text 1010 shown in FIG. 8A.

Case 1: Adjusting Text Length and Font Size Undetectable.

Existing composition programs allow text length to be changed by horizontal scaling of all letters, adjusting the between-letter kerning, or adjusting all space sizes uniformly. In existing programs, the scaling is uniformly applied to all features on a line or an entire text. This can lead to noticeable change in the text appearance, either making the characters look too thin overall (especially characters like /l/ that are thin already), or too wide overall (especially characters that are wide already such as /w/). The Nussbaum patent proposes to vary the scaling of letters randomly, to reduce the obviousness of the scaling overall. Our approach is distinct in that it systematically controls the scaling of each character (adjustment of the physical feature) to be unnoticeable in two ways: (1) the scaling of each character is separately controlled according to its CIM. This results in physical adjustment in each character related to how important that character is in contributing to text comprehension; and (2) the range of the scaling allowed for each character can be distinct for each character (or subsets of characters such as 'thin', 'wide', 'punctuation', etc), further reducing the obviousness of the scaling overall (e.g., punctuation such as periods and commas would be allowed to be adjusted by different amounts than other characters such as spaces or letters; different letters such as 'thin' letters like an /i/ or /l/ would be allowed to be adjusted by a different amount than 'wide' letters such as a /m/ or /w/ for the same CIM). The user could select "all characters same" or "set individual character ranges". The user might set a default scaling parameter and selectively change the parameter for certain characters. The user might specify different parameters for characters and punctuation marks or for "wide" and "thin" characters, etc. The result is that the invention can be used to increase or decrease the number of text lines while maintaining or even increasing readability. As shown in FIG. 8B, the text 1012 has been formatted to maintain length while improving readability. As shown in FIG. 8E, the text 1014 has been formatted to increase length to fill a line. As shown in FIG. 8C, the text 1015 has been formatted to decrease length to save one line.

Case 2: Adjust Font Size without Changing Physical Space.

Another practical use for the invention is to increase the font size while maintaining the physical space needed for the text (e.g., maintaining line length, between line leading, and overall number of text lines). In this embodiment, a larger font for the text can be used while information-based scaling shortens the width of each character individually. The font size may be changed either in the compositing program or prominence modification program. The practical result is a larger, more readable font, with no additional space required and improvement in legibility and readability as shown by text 1016 in FIG. 8D.

Case 3: Information Compression.

Yet another practical use for the invention is to selectively decrease the visual prominence of characters to an extreme degree, resulting in "informational compression". This can be used for media presentations where space (or visual inspection time) is limited, as in small electronic displays, or displays of information requiring rapid understanding. The compression can be visually unusual, with some of the letters being very narrow 1018, as in FIG. 11A. In another embodiment the letters with the least informativeness can be progressively replaced with a small symbol, for example, a midpoint (also called small bullet) 1020, which takes up less physical space than the character itself, as in FIG. 11B. In another embodiment, characters below a particular threshold can be progressively deleted 1022 according to the CIM, as in FIG. 11C. The user may select a constraint "information compression" and select the embodiment to select the proper wrapper to implement the task.

Case 4: Character Recognition.

In another embodiment, a CIM could be used in handwriting recognition or optical character recognition program to facilitate word recognition by progressively narrowing in on target word identity using the identity of recognized characters to weight the likely identity of unrecognized characters. Similarly, a CIM could be used for improved automatic spell checking word replacement, or suggested word replacement, and string searching (e.g., web search engines). Again, the user would select a constraint "character recognition" or "spell check", which would cause the main program to select the proper wrapper for this task.

Case 5: Composing Text to Maximize Readability.

A normal goal of text composition is to maximize its readability—its overall aesthetic appearance according to industry standards. In general, existing paragraph composing programs (e.g., TeK, InDesign, QuarkXPress) embody methods that control such layout aspects (aesthetic constraints) as the frequency of hyphens, variation in line density, variation in between-word space size, among others. The CIM control of physical features such as individual character width (including space width) increases the tools available to such paragraph composing programs by allowing adjustment of each character and space according to their informativeness. Thus, the kind of manipulations available to subtly affect the length or compactness of print for an entire text can be applied to individual lines in the service of improved paragraph composition. In the case of a computational method of implementing the informativeness scaling, it can be integrated with other programs that maximize formatting factors that affect text length, appearance and readability.

For example, in a sample text FIG. 12A, the initial line layout 1030 has a relatively large variation in line length. One option is to use hyphening 1032 as in FIG. 12B. If the user wants to apply a constraint that minimizes line length variation, or to shorten the entire word /Every/ should be moved back to the prior line, but as it stands there is not quite enough room. In this case, the method can shrink the second line very slightly to make room for /Every/, without hyphenation 1034, as in FIG. 12C. In other cases, the desire may be to stretch a line to minimize line length variation or for some other reason while maintaining paragraph length. For example, with a slightly shorter line length the sample paragraph 1036 might appear as in FIG. 12D. The line length variation can be reduced if the second line is now expanded slightly, while the first and third lines are shrunk slightly 1038 as in FIG. 12E.

Note that if the shrinking/expanding method is combined with the sensitivity to space informativeness in relation to line breaks, the line length of the third line can be maintained, while the "is" is moved to the next line. This is because the informativeness of the space between "this" and "is" is very high, and between "is" and "normal" is low. FIG. 12F presents an exaggerated representation of how those two spaces might be scaled 1040, (using # to represent an additional increment of space, and assuming that the space is treated as part of the following word).

Normal word-wrap functions will automatically take that input and force the "is" to the next line because there is no room for it on the third line (by default in text editing and layout programs, the larger space will hang invisibly beyond the margin and the word following it will begin on a new line of text). Theses procedures result in FIG. 12G. The result is a right justified appearing line 1042, in which the justification has been achieved by adjusting the word spaces, letterspacing (kerning), and horizontal character scaling according to their informativeness. Controls on line looseness (ratio of space to words) can restrict such promotion of words from one line to the next, so that the line left behind does not become too loose.

A procedure for maximizing the readability of a paragraph by minimizing variation in line length in response to user selection of "minimize variation in line length" follows. First, for a given block of text (e.g., a paragraph or a moving window of text containing a user-selectable number of lines), the wrapper computes the length of each line. Second, the wrapper computes the mean line length for the text block. Third, for each line that is less than the average length, the wrapper applies the automatic program described in FIG. 6B to increase the prominence of characters in each line using a CIM until the lines are identical in length.

A procedure for maximizing the readability of a paragraph by minimizing line ending hyphenation in response to user selection of "minimize line ending hyphenation" follows. First for a given block of text, the wrapper computes (1) the total number of hyphens, and (2) the number of consecutive hyphens in a row. Second, the wrapper computes the length of each line. Third, the wrapper computes the mean line length for the text block. Fourth, for lines with hyphens and that are less than the average length, the wrapper applies the automatic program described in FIG. 6B to increase the prominence of characters in each line using a CIM until the hyphen is removed (and the hyphenated word fits on the next line). Alternatively, for lines that contain hyphens and are above average in length, the wrapper applies the automatic program described in FIG. 6B to decrease the prominence of characters in each line using a CIM until the hyphen is removed (and the hyphenated word fits on one line). This process can be applied literately across multiple lines in text selection and the 'best' outcome with the fewest total number of hyphens or the fewest number of consecutive hyphens can be selected to reduce the overall use of hyphens within user-specified constraints on how much each line can have characters horizontally scaled.

A procedure for minimizing the variation in word space size in response to a user selection of "minimize variation in word space size" follows. First, for a given block of text (e.g., a paragraph or a moving window of text containing a user-selectable number of lines), the wrapper computes the length of each line. Second, the wrapper counts the number of word spaces for each line and computes the mean word space size for each line in the text block. Third, the wrapper computes the average of mean (per-line) space size across all of the lines in the text block. Fourth, for each line with mean space size less than the mean selection-wide space size, the wrapper applies the automatic program described in FIG. 6B to increase the prominence of characters in each line using a CIM until the spaces sizes are identical (or the user-specified maximum is reached). Fifth, for each line with mean space sizes more than the mean selection-wide space size, the wrapper applies the automatic program described in FIG. 6B to decrease the prominence of characters in each line using a CIM until the spaces sizes are identical (or the user-specified minimum is reached).

Case 6: Composing Text to Maximize Legibility.

According to many models of the reading process, it involves an initial stage of recovering words and meaning from surface character cues and features (Goodman and Goodman, Gough, McClelland). The current invention provides a basis for making the most informative characters and features more prominent than less informative characters and features. This can guarantee that even random eye fixations will be more likely to fall on the more informative characters and features; it also may 'attract' the eye fixations from the periphery of one fixation to the next fixation, guiding fixations to fall on the more informative characters and features. FIGS. 8B-E show several embodiments that emphasize characters that are relatively critical for recognition and deemphasize characters that are relatively less critical for recognition.

Another aspect of legibility involves how sub-lexical units of information are composed together to contribute to the meaning of a word. The invention includes assignment of an information value to sublexical character sequences, based on their frequency of co-occurrence. This affects the informativeness of the transition between the bounding character of one sublexical sequence and the adjacent character (at the least by making the adjacent character more informative overall). In general, the first character of a sublexical sequence will usually be its most informative. The user can elect the option of increasing the kerning at the beginning of a character proportional to its informativeness: this will have the overall effect of enlarging the left-side kerning for the first character of a sublexical information unit and the left side kerning for a character just after the end of one sub-lexical unit and the potential beginning of the next such unit (see FIG. 9B, "pull ing"). This informational segregation can increase the reader's access to the word and its meaning by automatically making more predictable characters more closely linked to what precedes them, thereby creating visible segregation of informationally important strings of characters.

A procedure for increasing the intra-lexical unit kerning between sub-lexical units in response to a user selection of "increase kerning between sub-lexical units" follows. First, for a given block of text (e.g., a paragraph or a moving window of text containing a user-selectable number of lines), the wrapper computes the length of each line. Second, the wrapper computes the mean line length for the text block. Third, for each line that is less than the average length, the wrapper applies the automatic program described in FIG. 6*b* to increase the kerning at the beginning of (1) a sub-lexical units using a sub-lexical information IM, or (2) at the beginning of each character using a CIM until the line length is identical to the mean line length for the selection or a user-specified maximum kerning value is reached. The choice between using just a single sub-lexical IM between sub-lexical units or a CIM for each character could be user-selectable.

Another aspect of legibility involves how extra-lexical units of information are composed together to contribute to the meaning of the text. The user can choose to scale between word spaces according to their informativeness. This will tend to visually segregate multi-word units that correspond to their higher order composition into larger informational units as shown in FIG. 7C. It can also have the result of reducing the extent to which line breaks interrupt extra-lexical units, as in FIGS. 12E-G.

A procedure for an aesthetic constraint of "maximizing the goodness of line breaks" using a CIM is contrasted to minimization of badness using penalties developed by Knuth and Plass and widely used in typesetting programs such as TeX and Adobe InDesign. The distinction between maximizing goodness of linebreaks and minimizing badness of linebreaks is important. Methods that minimize aesthetically undesirable linebreaks emphasize readability without regard for legibility because the constraints are only penalties to aesthetic outcomes that are considered 'bad' outcomes. CIM values for spaces and other inter-lexical punctuation indicate the breaks that are the most informative and thus can be used to maximize readability across linebreaks. Alternatively, a 'balanced' approach of examining line endings across a text block (e.g., a paragraph) could compute the optimal line breaks that both maximizes goodness for legibility and minimizes badness for readability by using a composite or hybrid scoring system. Such a method would produce an intermediate outcome with improved legibility over standard methods that just minimize badness of linebreaks and improved readability over the method described above that just maximizes goodness of linebreaks using a CIM based on informativeness.

To maximize the goodness of line breaks, all possible combinations of line endings in a paragraph are considered. For each set, the informativeness of the line ending is determined by the CIM for the punctuation (space, period, comma, etc.) character ending that line. The CIMs are summed for each line in the text block (e.g., a paragraph or a moving window of text containing a user-selectable number of lines) and stored for comparison. This cumulative CIM value represents the sum informativeness of the line endings for that text block. After iterating through all possible combinations of line endings, the goodness values are compared and the maximum cumulative CIM is selected. This set of line endings represents the best solution for maximizing legibility across line breaks. This technique could be combined with the traditional (Knuth) method used to minimize variation in line length (or average space size for right justified text) to achieve a user-controlled balance in composition between traditional aesthetic factors and legibility. A procedure for a user-selectable 'balance' between maximizing the goodness (good legibility) of line breaks with minimizing the badness (poor readability) of line breaks follows. A user could choose a sliding scale from 0 to 100 that represents the percentage of weight given to maximizing goodness (and conversely 100% minus this value represents the percentage of weight given to minimizing the badness of line breaks using traditional Knuth and Pass). Next, this user-controlled pair of weights applied to scale the goodness values and badness values for each line. Finally, these scaled values are summed across all of the lines in the text selection and the best (highest value) weighted outcome is selected across all possible line-break choices.

In another embodiment, the spaces that precede a word at the beginning of a line (i.e., that has been moved to a succeeding line) may actually be printed, creating a line indented in the amount corresponding to the informativeness of the preceding space. This would make the last line of the sample short paragraph 1044 above appear as in FIG. 12H. The net result of this embodiment can be to place extra-lexical units on separate lines, indented according to the informativeness of the preceding space or punctuation+space. Applied generously to the sample paragraph and relaxing the restriction on the right margin, this procedure could yield the composed text 1046 shown in FIG. 12I.

This method of arranging text may help the reader compute not just where the informational units are, but how they are related to each other sequentially. Note, this is quite distinct from another way to present subsequences indented differentially; that method first assigns a hierarchical traditional phrase segmentation to the entire sentence, and then indents each new segment in relation to the preceding one (i.e., always indented more). The present method actually yields very different patterns, which correspond to the informational structure of the text, not the abstract linguistic structure.

Case 7: Animated Text Presentations.

Various environments allow for the dynamic presentation of text information. This may be of practical value in situations requiring rapid transmission of information, or on devices with limited display size. The CIM of each feature, character, or unit can be used to control specified aspects of such dynamic presentations.

a) Serial Presentation

Numerous studies of language comprehension have used serial presentations of text as stimuli in experimental settings. This includes letter by letter presentation, word by word, phrase by phrase and sentence by sentence; in some cases the presentation rate is controlled by the human subject, in others it flows at an experimenter controlled rate. In some cases, the text appears normally from left to right, on conventional lines; in others, each successive presentation replaces the prior presentation in the same location on a display device. The current invention modifies and builds on this prior art. It controls every aspect of text appearance in these varying paradigms according to the CIM of that aspect. Thus, an English word might be presented serially, from left to right with each character appearing for a length of time corresponding to its CIM, before the next letter appears; or it might be presented with each letter appearing in order of its CIM, either in its appropriate serial position, or such that each successive letter replaces the previous one, working in time. In serial left-right positioning, the word length might be initially indicated by a series of nonsense characters that are replaced according to the CIM of each letter in the word. Finally, the CIM for the space following each word can be included in adjusting the timing of the word display or the interval between words.

b) Parallel Presentation

In some implementations the total time differences of the first to the last presentation of the letters in a word, might be so brief that the word would consciously appear to be presented with all letters simultaneously; but the subtle differences in onset time may stimulate more rapid recognition of the word by initiating earlier processing of the more informative letters.

Corresponding presentation schemes can be applied to lower level aspects of text (e.g., character features) or higher levels (e.g., extra-lexical units). In the latter case, the duration imposed by between word spaces can correspond to their informativeness, or the duration of each word controlled by the total informativeness of its letters.

A salient practical application of serial control is in the formatting and timing of programs that present live closed-captions for the deaf, or second language learners. These programs tend to end lines in the middle of information units, and tend to have long pauses before very infrequent (high information) words. The result is that the text splits up high information units in space and time. The sample paragraph might appear as (space size corresponds to time delay):

Harry is amazed the crow is in this
   beautiful garden. Every one
else thinks this is normal.

By using the informativeness of spaces to adjust timing and line breaks, this odd presentation can appear with the information units more naturally presented as:

Harry is amazed. The crow is in
this beautiful garden. Every one else
thinks this is normal.

This control of closed captioning introduces a slightly larger delay between the speaker's utterance and the captioned display. But the improvement in presentation of the informative aspects of the speech may more than compensate for that disadvantage.

Case 8: Other Media.

The invention has focused on the adjustment of conventional text presented in some visual mode. Other methods of presenting language may also be controlled by informativeness analysis. In one embodiment of this, special coding of characters in other modalities can be controlled in ways corresponding to the control of visual text. For example, in the haptic mode, Braille characters can be adjusted physically according to their informativeness. Auditorally, symbol systems such as Morse code can be modified according to informativeness.

A promising embodiment is the adjustment of physical variables in the output of text to speech programs. With normal speaking rates, this may enhance comprehensibility of the text, by emphasizing the physical prominence of sounds corresponding to informative characters. Most important, it offers speech compression programs a new method of compressing sounds in proportion to the informativeness of the characters or character sequences they correspond to. This can lead to more information-sensitive compression, hence improving comprehension of compressed speech in various applications (including books and newspapers prepared for the blind). In one embodiment of this application, a text-to-speech program is used in its phonetic mode (in which the physical characteristics of each phone can be controlled): the instructions from the actual spelling determine the loudness and duration of the phonological correlate of each letter, in relation to that letter's informativeness. At normal speech rates, this may enhance the comprehension of the speech in noisy backgrounds, or simply to overcome some of the comprehension difficulties of the naturalness of computer generated speech. In rapid, compressed rates, the instructions compress each component of the phonetic sequence in terms of the informativeness of the corresponding letter(s) as input.

In the case of speech, the information metric (or one or more of the IMs) could be a calculation of the informativeness of each sound-phone based on its edit distance from other words with corresponding phonetic environments, e.g., a so called "phonologic information metric". That would produce an "acoustic/phonetic CIM", which may be more useful than a text based CIM for compressing speech. For languages with more regular letter/sound correspondences than English, the text-based CIM would work fine—e.g., Russian, Serbocroation, Spanish, etc—but not symbolic systems such as Chinese.

Applications to Education

In general, since the method is designed to improve legibility, it can have wide application in educational markets. The assignment of a CIM can be made for any particular input text. Thus it is possible to have different CIMs for the same features, characters, words, and word sequences as a function of the source language. This also applies to the choice of texts within a language. The CIM can be compiled within a language as a function of the text chosen on which it is based. This affords the opportunity to scale CIMs for texts as a function of the expected reader and his or here vocabulary. Thus, a graded series of CIMs can be prepared for children as they learn to read: at each level, the text can be adjusted physically to comport best with that level of vocabulary and text style.

Complexity Measures

Automatic analysis of text complexity is an important tool in the design of instructional and educational materials. Usually, such measures are based on linguistic analysis, length of words, ease of computing a particular linguistic construction. Such measures are based on knowledge of the spoken language, and theories of how it is comprehended. But they do not take into account the effectiveness or transparency of the particular written text as a visual stimulus. The current invention can apply the CIM measures to provide a summary metric for the 'visual' informativeness of a feature, character, word, word sequence, or entire text. This can be used as a tool for the construction of texts that are maximally decodable. First, the CIM is determined for each character in an entire text (or a user selected) subset. Second, the mean CIM (and standard deviation or other measure of variance of the CIM) is computed across all characters. Third, this mean CIM and variance measure per character value is compared to a database of mean and variance CIM per characters computed from other texts to determine relative complexity of the text. Fourth, this mean per character CIM and relative complexity ranking are reported to the user. Such a tool could be used interactively to judge the sections of text that could benefit from rewriting if a certain target level of complexity is desired. The steps just described can also be used to identify which regions of a document are more or less complex. This could be used to target regions (lines, paragraphs, sections) of a document that are the most complex (and thus difficult to read) and to differentially apply a different range of minimal and maximal prominence variation to the regions of a document where this composition would improve legibility the most. An important use of this would be situations in which aesthetic considerations such as readability are preferred overall for a text selection, but limited use of legibility improvement desired in for the most difficult to read portions of a selection.

Distribution Methods

The present invention can be made available to users in a number ways, e.g., as fonts, a program embodied in a computer readable media such as a memory or disk, as a plug-in, a dedicated integrated circuit (IC) chip or a computer system. One implementation is as a hosted or distributed application which may provide enhanced functionality to existing text composition programs, operate as a stand alone text compositor or text processing program or operate through onscreen display applications, such as a web browser. The present invention may also be implemented in the design of fonts. In this implementation, a font is provided with several glyphs for each character, corresponding to different levels of salience for that character. Each lexical unit is coded—based on a large generic corpus or a selected genre—with an IM for each character or subunit in the unit. The user selects an overall goal (e.g., shortening text, enhancing readability but maintaining length, lengthening text). A program that comes with the font selects glyphs for each character based on the IMs appropriate to the selected user goal. This can include applications to control the choice of glyphs for spaces and punctuation between words, following the procedure for assigning IM to between word characters.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A computer-implemented method embodied in a non-transitory medium for composing text, said method configured to execute the computer-implemented steps of:
   a) reading in successive blocks of text input having defined characters including letters and punctuation in a format;
   b) examining a language unit in the text input of the current block;
   c) assigning a combined information measure (CIM) to each character in the language unit indicating the predictability of that character to differentiate the language unit from other language units;
   d) repeating steps b and c for a plurality of language units in the current block;
   e) determining an adjustment of a physical feature of each said character in said plurality of language units to modify the prominence of that character according to the values of the assigned CIMs;
   f) applying the physical feature adjustment to each said character in said plurality of language units in the text input to compose the text input consistent with said format;
   g) repeating steps b through f for the next block of text input; and
   h) outputting the composed text input by writing it to a storage device, printing it onto a visually readable medium, displaying it on a visual display unit, imprinting it onto a tactile medium or converting to an audio output.

2. The method of claim 1, wherein steps b and c are repeated for all of the language units in the text input in the current block until a CIM has been assigned to all of the characters.

3. The method of claim 1, wherein the CIM is a text-based information measure and wherein the adjustments to the physical feature modify the visual prominence of the character.

4. The method of claim 1, wherein assigning a CIM to each character comprises:
   computing a plurality of information measures (IMs) selected from lexical, extra-lexical, sub-lexical and sub-character informativeness IMs for each character in the language unit; and
   combining the plurality of IMs into the single CIM for each said character.

5. The method of claim 4, wherein the individual IMs are computed as follows:
   said lexical IM computed as a lexical frequency IM that represents the frequency of a lexical unit in a selected corpus or an inter-lexical similarity IM that identifies how lexical units are confused with other similar lexical units;
   said extra-lexical IM computed as a lexical sequence IM that measures the informative of extra-lexical characters at the boundary between lexical units or a distributionally determined lexical category IM that measures the serial predictability of a given lexical unit based on its lexical category;
   said sub-lexical informativeness IM computed as a character sequence IM that measures the informativeness of a series of characters, a sub-lexical frequency IM that measures the frequency of a sub-lexical unit, a phonological prominence IM that measures the relative informativeness of sequences of characters of the pronounced lexical unit or an orthographic pattern IM that measures the informativeness of character to sound correspondence; and
   said sub-character informativeness IM computed as a measure of the informativeness of sub-character features.

6. The method of claim 1, wherein the adjustment of a physical feature is determined by,
   defining a mapping as a function of the CIM to determine a permissible range of adjustments; and
   applying that mapping to each CIM value to get the adjustment.

7. The method of claim 6, wherein the mapping is computed for each language unit, subset of language units in the text block or the entire block.

8. The method of claim 7, wherein the mapping is applied to each character by either directly transforming the CIM value to a particular adjustment and scaling the physical feature for a given font by the particular adjustment or using the mapping to select from a subset of different fonts or glyphs.

9. The method of claim 6, wherein the mapping maps a range of CIM values to the permissible range of adjustments set by the user or the computer implemented method.

10. The method of claim 9, wherein the permissible range of adjustments is limited by a measure of available space to preserve the overall length of the block of text input while allowing at most as much variation as permitted by the permissible range.

11. The method of claim 6, further comprising:
    user selection of one or more aesthetic constraints on the composed text input;
    determining whether the composed text input satisfies the one or more aesthetic constraints; and
    if the aesthetic constraints are not satisfied, adjusting the mapping or physical feature and repeating step e to determine the adjustment of the physical feature for at least a sub-portion of the text input in the current text block.

12. The method of claim 11, further comprising user or automated selection of constraint parameters for the one or more aesthetic constraints.

13. The method of claim 11, further comprising pre-processing the text block to determine parameters relevant to the aesthetic constraints for use in selection of the physical feature or definition of the mapping.

14. The method of claim 11, wherein steps b-c are repeated for all of the language units in the text input in the current block until a CIM has been assigned to all of the characters and an adjustment determined for the physical feature of all said characters for at least the first iteration.

15. The method of claim 11, wherein said one or more aesthetic constraints are selected from a target length of the text block, an acceptable variation of line length or line looseness, a frequency of line ending hyphenation, maximize readability, maximize legibility, balance readability and legibility, maximizing the goodness of line breaks, balance minimizing variation in line length or line looseness and maximizing the goodness of line breaks.

16. The method of claim 11, wherein the mapping maps a range of CIM values to the permissible range of adjustments as set by the user or the computer implemented method, and wherein adjusting the mapping comprises adjusting said permissible range.

17. The method of claim 11, wherein the mapping is defined as a function of the CIM, available line space, a number of characters in the line and the current extent of the character to distribute the available space proportionally to each character's CIM, and wherein adjusting the mapping comprises adjusting how the available space is distributed throughout the block of text to accommodate adjustments to the physical features.

18. The method of claim 9, wherein a permissible range of values is set for either all characters, each of all letters and all punctuation, each of subsets of 'thin', 'medium' and 'wide' characters, or a default subset of all characters and subsets of specifically selected characters.

19. The method of claim 1, wherein the physical feature is selected from one or more of horizontal scaling, vertical scaling, saturation, typeface weight, stroke thickness, slant, lexical unit spacing, character spacing, character feature curvature, character feature thickness, brightness, or hue.

20. The method of claim 1, wherein the physical feature is the timing of character presentation to a visual display.

21. The method of claim 1, wherein said language unit is defined to include one of a lexical unit, a sub-lexical unit, or a subset of punctuation including spaces.

22. The method of claim 6, wherein the mapping is defined as a function of the CIM, available line space, a number of characters in the line and the current extent of the character to distribute the available space proportionally to each character's CIM.

23. The method of claim 1, wherein application of the physical feature adjustments increases the visual prominence of characters that are more informative and decreases the visual prominence that are less informative according to the value of the assigned CIM.

24. The method of claim 1, wherein the method is embodied in a computer-readable disk, memory or integrated circuit (IC) chip.

25. A plug-in application embodied in a non-transitory medium for use with a composition program for composing text, said plug-in configured to execute the computer-implemented steps of:
   a) receiving successive blocks of text input from said composition program, said text input having defined characters including letters and punctuation and being configured in a format;
   b) receiving composition information including a list of values for at least one physical feature of the characters in said text input;
   c) examining a language unit in the text input of the current block;
   d) assigning a combined information measure (CIM) to each character in the language unit indicating the predictability of that character to differentiate the language unit from other language units;
   e) repeating steps c and d for a plurality of language units in the current block;
   f) determining an adjusted value of said at least one physical feature of each said character in said plurality of language units to modify the prominence of that character according to the values of the assigned CIMs; and
   g) returning the list of adjusted values for the text input in the current block to the text composition program to compose the text input consistent with said format.

26. The plug-in of claim 25, wherein the method is embodied in a computer-readable disk, memory or integrated circuit (IC) chip.

27. The plug-in of claim 25, wherein assigning a CIM to each character comprises:
   computing a plurality of information measures (IMs) selected from lexical, extra-lexical, sub-lexical and sub-character informativeness IMs for each character in the language unit; and
   combining the plurality of IMs into the single CIM for each said character.

28. The plug-in of claim 27, wherein the adjustment of a physical feature is determined by,
   defining a mapping as a function of the CIM to determine a permissible range of adjustments; and
   applying, that mapping to each CIM value to get the adjustment.

29. The plug-in of claim 28, wherein application of the physical feature adjustments increases the visual prominence of characters that are more informative and decreases the visual prominence that are less informative according to the value of the assigned CIM.

30. A system for composing text, comprising:
   an input device for providing a text input having characters including letters and punctuation including spaces;
   an output device;
   one or more storage devices configured to store (I) as first sequence of computer instructions to create, edit and store the text input and output a composed text input that is visually rendered on the output device, said instructions generating successive blocks of text input in a format and a list of values for one or more physical features for the characters and (II) a second sequence of computer instructions that process the successive blocks of text input to return a list of adjusted values for the text input that increase the visual prominence of characters that are more informative and decrease the visual prominence of characters that are less informative consistent with the format in the composed text output; and
   a processor configured to execute the first and second sequences of computer instructions.

31. The system of claim 30, wherein the second sequence of computer instructions execute the following steps for each block:
   a) examine a language unit in the text input;
   b) assign a combined information measure (CIM) to each character in the language unit indicating the predictability of that character to differentiate the language unit from other language units;
   C) repeat steps a and b for a plurality of language units;
   d) determine an adjustment of the value for at least one said physical feature of each said character in said plurality of language units to modify the prominence of that character according to the values of the assigned CIMs; and
   e) return the list of adjusted values to the first sequence of computer instructions.

32. The system of claim 31, wherein the second sequence of computer instructions execute the following steps to assign a CIM to each character:
   compute a plurality of information measures (IMs) selected from lexical, extra-lexical, sub-lexical and sub-character informativeness IMs for each character in the language unit; and
   combine the plurality of IMs into the single CIM for each said character.

33. The system of claim 31, wherein the second sequence of computer instructions executes the following steps to determine the adjustment of a physical feature:
   define a mapping as a function of the CIM to determine a permissible range of adjustments; and
   apply that mapping to each CIM value to get the adjustment.

34. A plug-in application embodied in a non-transitory medium for use with a composition program, said plug-in configured to execute the computer-implemented steps of:

a) receiving successive blocks of text input from said composition program, said text input having defined characters including letters and punctuation and being configured in a format;

b) receiving composition information including a list of values for at least one physical feature of the characters in said text input;

c) user selection of one or more aesthetic constraints on the text input;

d) examining a language unit in the text input of the current block;

e) assigning a combined information measure (CIM) to each character in the language unit indicating the predictability of that character to differentiate the language unit from other language units;

f) repeating steps d-e for the next language unit until all of the text input in the current block has been processed and a CIM assigned to each character;

g) defining a mapping of a range of CIM values for each language unit, a subset of language units or the entire text block to a permissible range of adjustments for a physical feature, and h) applying that appropriate mapping to each CIM value to determine an adjusted value of said at least one physical feature of each said character in the plurality of language units in said text block to modify the prominence of that character according to the values of the assigned CIMs;

i) determining whether the text input composed with the adjusted values will satisfy the one or more aesthetic constraints;

j) if the aesthetic constraints are not satisfied, changing the mapping or physical feature and repeating steps (g) and (h) to determine the adjustment of the physical feature for at least a sub-portion of the text input in the current text block; and k) returning the list of adjusted values for the text input in the current block to the text composition program to compose the text input consistent with said format and user-selected aesthetic constraints.

* * * * *